US012802292B2

(12) United States Patent
Yako et al.

(10) Patent No.: US 12,802,292 B2
(45) Date of Patent: Nov. 17, 2026

(54) SIGNAL PROCESSING APPARATUS AND SIGNAL PROCESSING METHOD

(71) Applicant: Panasonic Intellectual Property Management Co., Ltd., Osaka (JP)

(72) Inventors: Motoki Yako, Osaka (JP); Takayuki Kiyohara, Osaka (JP); Katsuya Nozawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 311 days.

(21) Appl. No.: 18/540,962

(22) Filed: Dec. 15, 2023

(65) Prior Publication Data

US 2024/0119645 A1 Apr. 11, 2024

Related U.S. Application Data

(63) Continuation of application No. PCT/JP2022/025013, filed on Jun. 23, 2022.

(30) Foreign Application Priority Data

Jul. 6, 2021 (JP) ................................ 2021-112254

(51) Int. Cl.
*G06T 11/00* (2026.01)
*G06T 7/90* (2017.01)
(Continued)

(52) U.S. Cl.
CPC ................ *G06T 11/10* (2026.01); *G06T 7/90* (2017.01); *H04N 25/13* (2023.01); *G06T 2200/24* (2013.01); *G06T 2207/10024* (2013.01)

(58) Field of Classification Search
CPC ....... G06T 11/10; G06T 7/90; G06T 2200/24; G06T 2207/10024; H04N 25/13
See application file for complete search history.

(56) References Cited

U.S. PATENT DOCUMENTS 7,035,457 B2 * 4/2006 Ishibashi ................ G06T 9/007 382/232
2016/0138975 A1 5/2016 Ando et al.
(Continued)

FOREIGN PATENT DOCUMENTS

JP 2009-159068 7/2009
JP 2017-015694 1/2017

OTHER PUBLICATIONS

NPL: InnovationQ+ by IP.com and IEEE: Jun. 2, 2016 to Feb. 6, 2026.*

(Continued)

*Primary Examiner* — Quang N Vo
(74) *Attorney, Agent, or Firm* — Wenderoth, Lind & Ponack, L.L.P.

(57) ABSTRACT

A signal processing method executed by a computer includes acquiring compressed image data including two-dimensional image information of a subject obtained by compressing hyperspectral information in a target wavelength region, acquiring reference spectrum data including information on one or more spectra associated with the subject, and generating, from the compressed image data, pieces of two-dimensional image data corresponding to designated wavelength bands decided on the basis of the reference spectrum data.

16 Claims, 29 Drawing Sheets

(51) Int. Cl.
*G06T 11/10* (2026.01)
*H04N 25/13* (2023.01)

(56) References Cited

U.S. PATENT DOCUMENTS

2017/0003168 A1 1/2017 Fujii et al.
2018/0365820 A1* 12/2018 Nipe ...................... G06V 20/10

OTHER PUBLICATIONS

International Search Report of PCT application No. PCT/JP2022/025013 dated Aug. 9, 2022.
Amicia D. Elliott et al., "Real-time hyperspectral fluorescence imaging of pancreatic β-cell dynamics with the image mapping spectrometer", Journal of Cell Science vol. 125, Oct. 15, 2012, pp. 4833-4840.

* cited by examiner

| LOWER-LIMIT WAVELENGTH OF UNIT BAND | UPPER-LIMIT WAVELENGTH OF UNIT BAND | MASK IMAGE | BACKGROUND IMAGE | EXPOSURE PERIOD | GAIN |
|---|---|---|---|---|---|
| ⋮ | ⋮ | ⋮ | ⋮ | ⋮ | ⋮ |
| 400 | 401 |  |  | 10 | 2 |
| 401 | 402 |  |  | 15 | 1.8 |
| 402 | 403 |  |  | 12 | 1.2 |
| 403 | 404 |  |  | 13 | 1.6 |
| 404 | 405 |  |  | ⋮ | ⋮ |
| ⋮ | ⋮ | ⋮ | ⋮ | | |

| BAND NUMBER | CLASSIFICATION |
|---|---|
| 1 | SAMPLE 1 |
| 2 | SAMPLE 1 OR 2 |
| 3 | SAMPLE 3 |
| 4 | SAMPLE 4 |
| 5 | SAMPLE 3 OR 4 |

SIGNAL PROCESSING APPARATUS AND SIGNAL PROCESSING METHOD

BACKGROUND

1. Technical Field

The present disclosure relates to a signal processing apparatus and a signal processing method.

2. Description of the Related Art

By using spectral information of a large number of wavelength bands, for example, ten or more bands each having a narrow bandwidth, it is possible to grasp detailed physical properties of a target, which cannot be grasped from a conventional RGB image that does not have information other than three bands. Examples of a camera that acquires a such an image having a large number of wavelength bands include a "hyperspectral camera" and a "multispectral camera". These cameras are used in various fields such as food inspection, biological tests, development of medicine, and analysis of components of minerals.

U.S. Pat. No. 9,599,511 (hereinafter referred to as Patent Literature 1) discloses a compressed sensing type hyperspectral camera. The compressed sensing is a technique for generating a larger number of data than observed data by assuming that a data distribution of an observation target is sparse in a certain space (e.g., a frequency space). Estimation computation assuming sparsity of an observation target is called "sparse reconstruction". The hyperspectral camera disclosed in Patent Literature 1 acquires a monochromatic image through an array of filters whose spectral transmittance has a maximum value at wavelengths. The imaging device generates a hyperspectral image from the monochromatic image by computation based on sparse reconstruction.

Amicia D. Elliott et al., "Real-time hyperspectral fluorescence imaging of pancreatic b-cell dynamics with the image mapping spectrometer", Journal of Cell Science 125, 4833-4840 (2012) (hereinafter referred to as Non Patent Literature 1) discloses an example of a snapshot hyperspectral imaging device suitable for observation of a spectrum of fluorescence emitted from a fluorescent substance.

SUMMARY

According to the imaging device of Patent Literature 1, it is possible to take a high-resolution and multiple-wavelength moving image. However, since high-load reconstruction computation using matrix data of a size equal to a product of the number of pixels of an image sensor and the number of wavelength bands is performed, a processing circuit having high computing power is needed.

One non-limiting and exemplary embodiment provides a technique for reducing a load of reconstruction computation by efficiently generating an image of a necessary wavelength band.

In one general aspect, the techniques disclosed here feature a signal processing method executed by a computer, including: acquiring compressed image data including two-dimensional image information of a subject obtained by compressing hyperspectral information in a target wavelength region; acquiring reference spectrum data including information on one or more spectra associated with the subject; and generating, from the compressed image data, pieces of two-dimensional image data corresponding to designated wavelength bands decided on the basis of the reference spectrum data.

According to an aspect of the present disclosure, it is possible to reduce a load of reconstruction computation by efficiently generating an image of a necessary wavelength band.

It should be noted that general or specific embodiments of the present disclosure may be implemented as a system, an apparatus, a method, an integrated circuit, a computer program, a computer-readable storage medium, or any selective combination thereof. Examples of the computer-readable storage medium include a non-volatile storage medium such as a compact disc-read only memory (CD-ROM). The apparatus may include one or more apparatuses. In a case where the apparatus includes two or more apparatuses, the two or more apparatuses may be disposed in one piece of equipment or may be separately disposed in two or more separate pieces of equipment. In the specification and claims, the "apparatus" can mean not only a single apparatus, but also a system including apparatuses.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1A:
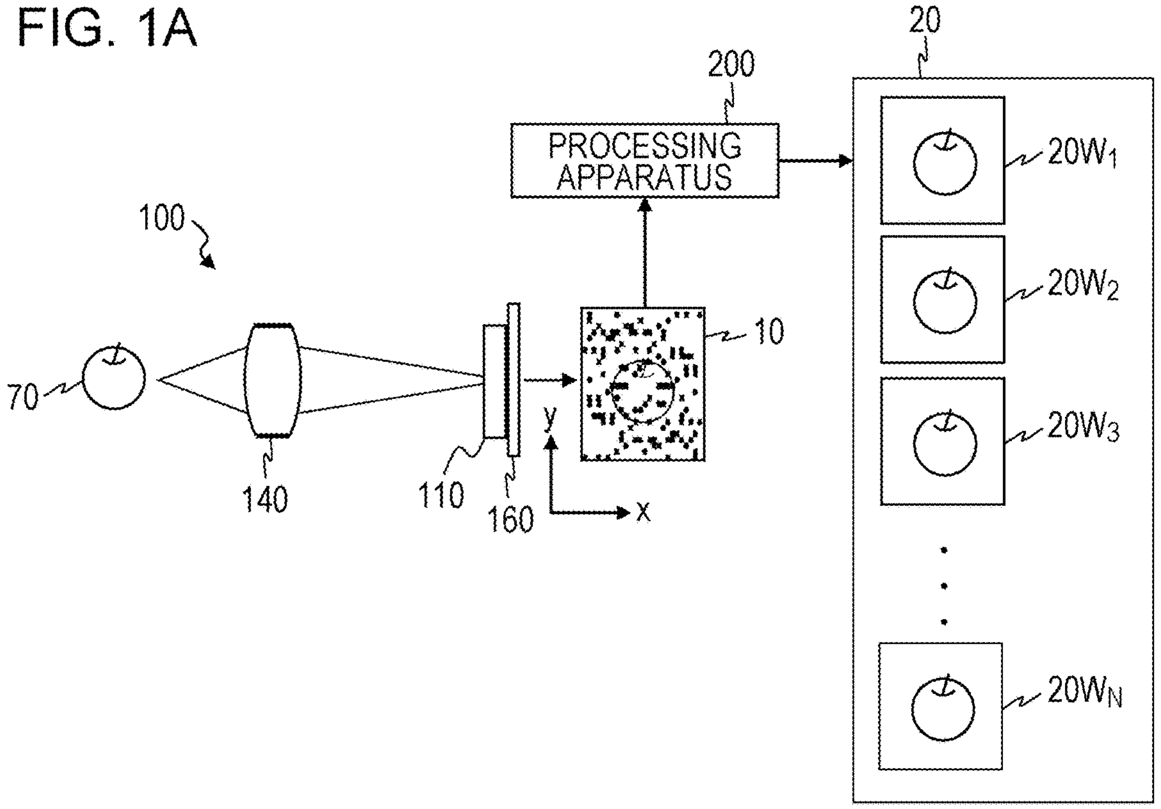
FIG. 1A schematically illustrates a configuration example of an imaging system.

Each of embodiments described below illustrates a general or specific example. Numerical values, shapes, materials, constituent elements, the way in which the constituent elements are disposed and connected, positions of the constituent elements, steps, the order of steps, and the like in the embodiments below are examples and do not limit the present disclosure. Among constituent elements in the embodiments below, constituent elements that are not described in independent claims indicating highest concepts are described as optional constituent elements. Each drawing is a schematic view and is not necessarily strict illustration. In each drawing, substantially identical or similar constituent elements are given identical reference signs. Repeated description is sometimes omitted or simplified.

In the present disclosure, all or a part of any of circuit, unit, device, part or portion, or any of functional blocks in the block diagrams may be implemented as one or more of electronic circuits including a semiconductor device, a semiconductor integrated circuit (IC), or a large scale integration (LSI). The LSI or IC can be integrated into one chip, or also can be a combination of plural chips. For example, functional blocks other than a memory may be integrated into one chip. The name used here is LSI or IC, but it may also be called system LSI, very large scale integration (VLSI), or ultra large scale integration (ULSI) depending on the degree of integration. A Field Programmable Gate Array (FPGA) that can be programmed after manufacturing an LSI or a reconfigurable logic device that allows reconfiguration of the connection or setup of circuit cells inside the LSI can be used for the same purpose.

Further, it is also possible that all or a part of the functions or operations of the circuit, unit, device, part or portion are implemented by executing software. In such a case, the software is recorded on one or more non-transitory recording media such as a ROM, an optical disk or a hard disk drive, and when the software is executed by a processor, the software causes the processor together with peripheral devices to execute the functions specified in the software. A system or apparatus may include such one or more non-transitory recording media on which the software is recorded and a processor together with necessary hardware devices such as an interface.

Underlying Knowledge Forming Basis of the Present Disclosure

Before description of the embodiments of the present disclosure, an outline of image reconstruction processing based on sparsity and processing of synthesizing and editing mask data used for reconstruction is described.

Sparsity is such a property that an element that characterizes an observation target is present sparsely in a certain space (e.g., a frequency space). Sparsity is widely observed in nature. By utilizing sparsity, necessary information can be efficiently observed. A sensing technique utilizing sparsity is called compressed sensing. By utilizing compressed sensing, it is possible to construct highly-efficient device and system. An example of application of compressed sensing to a hyperspectral camera is disclosed in Patent Literature 1. According to the hyperspectral camera disclosed in Patent Literature 1, a high-wavelength-resolution, high-resolution, and multiple-wavelength moving image can be taken in one shot.

An imaging device utilizing compressed sensing includes, for example, an array of optical filters having random light transmission characteristics concerning a space and/or a wavelength. Such an array of optical filters is sometimes called a "coding mask" or a "coding element". The coding mask is disposed on an optical path of light entering an image sensor, and allows light incident from a subject to pass therethrough according to light transmission characteristics that vary from one region to another. This process using the coding mask is referred to as "coding". The light coded by the coding mask is imaged by the image sensor. An image generated by imaging using the coding mask is hereinafter referred to as a "compressed image". Mask data indicative of light transmission characteristics of the coding mask is recorded in advance in a storage device. A processing circuit in the imaging device performs reconstruction processing on the basis of the compressed image and the mask data. By the reconstruction processing, reconstructed images having a larger number of pieces of information concerning a wavelength than the compressed image are generated. The mask data is, for example, information indicative of a spatial distribution of spectral transmittance of the coding mask. By such reconstruction processing based on the mask data, images of respective wavelength bands can be generated from a single compressed image.

The reconstruction processing includes estimation computation assuming sparsity of an imaging target. Computation performed in sparse reconstruction can be, for example, data estimation computation by minimization of an evaluation function including a regularization term, such as discrete cosine transform (DCT), wavelet transform, Fourier transform, or total variation (TV), such as the one disclosed in Patent Literature 1. Such estimation computation is high-load computation using mask data having a size equivalent to a product of the number of pixels of the image sensor and the number of wavelength bands. Therefore, a processing circuit having high computing power is needed. In a case where such high-load computation takes a longer time than an exposure period during imaging, the computation time limits an operating speed (e.g., a frame rate) of a camera.

In some fields of use of a hyperspectral camera, there are many cases where a spectrum assumed for a subject is known such as fluorescent observation and absorption spectrum observation (see, for example, Non Patent Literature 1). In a case where a spectrum assumed for a subject is known, it is possible to reduce a computation amount by properly editing or deleting mask data used for reconstruction processing. The mask data can be, for example, edited or deleted on the basis of information on a wavelength region necessary in processing such as analysis or classification performed after image reconstruction.

Based on the above finding, the present disclosure discloses a method for, in a case where a spectrum which a subject can have is known, lessening a load of arithmetic processing by referring to information concerning the known spectrum. In the following description, a known spectrum assumed for an individual substance contained in a subject, that is, an observation target is referred to as a "reference spectrum". Data indicative of a reference spectrum of one or more kinds of substances which an observation target can have is collectively referred to as "reference spectrum data".

An outline of an embodiment of the present disclosure is described below.

A signal processing method according to an exemplary embodiment of the present disclosure includes acquiring compressed image data including two-dimensional image information of a subject obtained by compressing hyperspectral information in a target wavelength region; acquiring reference spectrum data including information on one or more spectra associated with the subject; and generating, from the compressed image data, pieces of two-dimensional image data corresponding to designated wavelength bands decided on the basis of the reference spectrum data.

The "hyperspectral information in a target wavelength region" refers to information concerning a spatial distribution of luminance for each of wavelength bands included in the target wavelength region. The "compressing hyperspectral information" refers to compressing information concerning a spatial distribution of luminance of wavelength bands as a single monochromatic two-dimensional image by using a coding element such as a filter array that will be described later.

According to the above method, pieces of two-dimensional image data corresponding to designated wavelength bands decided on the basis of the reference spectrum data are generated from the compressed image data. It is therefore possible to lessen a load of arithmetic processing as compared with a case where two-dimensional image data corresponding to all wavelength bands included in the target wavelength region is generated.

The one or more spectra may be associated with one or more kinds of substances assumed to be contained in the subject. For example, data that defines a correspondence relationship between a substance and a spectrum may be stored in advance in a recording medium such as a memory. By referring to such data, it is possible to, for example, easily acquire information on a spectrum corresponding to a substance designated by a user.

Each of the designated wavelength bands may include a peak wavelength of the spectrum associated with a corresponding one of the one or more kinds of substances. Since each designated wavelength band corresponds to a single substance, classification based on a reconstructed image can be made easy.

The reference spectrum data may include information on spectra associated with kinds of substances assumed to be contained in the subject. The designated wavelength bands may include a first designated wavelength band having no overlapping between the spectra and a second designated wavelength band having overlapping between the spectra. This can make it easy to perform classification based on a reconstructed image even in a case where there is overlapping between spectra of two or more substances.

In the present specification, a case where a designated wavelength band "does not have overlapping between spectra" means that one of spectra has a significant intensity and the other spectra do not have a significant intensity in the designated wavelength band. On the contrary, a case where a designated wavelength band "has overlapping between spectra" means that two or more spectra have a significant intensity in the designated wavelength band. Whether or not the spectra have a "significant intensity" can be, for example, determined on the basis of an integral value obtained in a case where an intensity of each spectrum is integrated from a lower-limit wavelength to an upper-limit wavelength of the designated wavelength band. A maximum integral value among integral values of the spectra is regarded as a signal S, and a sum of other integral values is regarded as noise N. In a case where an S/N ratio obtained by dividing the signal S by the noise N is equal to or higher than a threshold value (e.g., 1, 2, or 3), it can be determined that the designated wavelength band does not have overlapping between spectra. On the contrary, in a case where the S/N ratio is less than the threshold value, it can be determined that the designated wavelength band has overlapping between spectra.

The compressed image data may be generated by using a filter array including kinds of optical filters that are different from each other in spectral transmittance and an image sensor. The signal processing method may further include acquiring mask data reflecting a spatial distribution of the spectral transmittance. The pieces of two-dimensional image data may be generated on the basis of the compressed image data and the mask data.

The mask data may include mask matrix information having elements according to a spatial distribution of transmittance of the filter array for each of unit bands included in the target wavelength region. The signal processing method may further include generating synthesized mask information by synthesizing the mask matrix information corresponding to non-designated wavelength bands different from the designated wavelength bands in the target wavelength region; and generating synthesized image data concerning the non-designated wavelength bands on the basis of the compressed image data and the synthesized mask information. Since a data amount is reduced by synthesizing mask matrix information of the non-designated wavelength bands, a load of arithmetic processing can be further reduced.

The generating the pieces of two-dimensional image data may include generating and outputting the pieces of two-dimensional image data corresponding to the designated wavelength bands without generating, from the compressed image data, image data corresponding to a non-designated wavelength band different from the designated wavelength bands in the target wavelength region. In other words, the signal processing method need not include generating, from the compressed image data, image data corresponding to a non-designated wavelength band different from the designated wavelength band in the target wavelength region. Since reconstruction processing is not performed for a non-designated wavelength band of low importance, a computation load can be further reduced.

The designated wavelength bands may be decided on the basis of an intensity of the one or more spectra indicated by the reference spectrum data or a differential value of the intensity. For example, each designated wavelength band may be decided so as to include a peak wavelength at which an intensity of a corresponding spectrum peaks. Alternatively, each designated wavelength band may be decided so as to avoid a wavelength region in which an absolute value of a differential value of an intensity of a corresponding spectrum is close to zero. According to such a method, a designated wavelength band including a characteristic part of a spectrum can be decided, and processing such as classification after reconstruction becomes smooth.

The reference spectrum data may include information on a fluorescence spectrum of one or more substances assumed to be contained in the subject. This makes it possible to perform reconstruction processing with a proper band configuration based on a fluorescence spectrum of a fluorescent substance.

The reference spectrum data may include information on a light absorption spectrum of one or more substances assumed to be contained in the subject. This makes it possible to perform reconstruction processing with a proper band configuration based on a light absorption spectrum of a substance.

The signal processing method may further include displaying, on a display, a graphical user interface (GUI) for allowing a user to designate the one or more spectra or one or more kinds of substances associated with the one or more spectra. The display can be connected to the computer or may be mounted on the computer. The reference spectrum data may be acquired in accordance with the designated one or more spectra or the designated one or more kinds of substances. This makes it possible to perform reconstruction processing with a band configuration according to a spectrum or a substance designated by a user on the GUI.

A method according to another embodiment of the present disclosure is a method for generating mask data used for generating spectral image data for each wavelength band from compressed image data including two-dimensional image information of a subject obtained by compressing hyperspectral information in a target wavelength region. The method includes acquiring first mask data for generating first spectral image data corresponding to a first wavelength band group in the target wavelength region; acquiring reference spectrum data including information concerning at least one spectrum; deciding one or more designated wavelength regions included in the target wavelength region on the basis of the reference spectrum data; and generating second mask data for generating second spectral image data corresponding to a second wavelength band group in the one or more designated wavelength regions on the basis of the first mask data.

The first wavelength band group can be a group of all or some wavelength bands included in the target wavelength region. For example, the first wavelength band group may be a group of unit wavelength bands having a minute bandwidth included in the target wavelength region. The second wavelength band group can be a group of all or some wavelength bands included in the designated wavelength region. For example, the second wavelength band group may be a group of unit wavelength bands included in the designated wavelength region. Each of the first wavelength band group and the second wavelength band group may be a group of synthesized bands obtained by synthesizing two or more unit wavelength bands. In a case where such band synthesis is performed, mask data conversion processing is performed in accordance with a form of the band synthesis.

According to the above arrangement, second mask data for generating second spectral image data corresponding to the second wavelength band group in the designated wavelength region decided on the basis of the reference spectrum data can be generated. Since the second mask data has a smaller data size than the first mask data, reconstruction can be performed efficiently by using the second mask data.

The method for generating the second mask data may be executed by an apparatus that generates spectral image data for each wavelength band from compressed image data on the basis of the second mask data or may be executed by another apparatus connected to the apparatus. The compressed image data may be generated by using a filter array including kinds of optical filters that are different from each other in spectral transmittance and an image sensor. The first mask data and the second mask data may be data reflecting a spatial distribution of spectral transmittance of the filter array. The first mask data may include first mask information indicative of a spatial distribution of the spectral transmittance corresponding to the first wavelength band group. The second mask data may include second mask information indicative of a spatial distribution of the spectral transmittance corresponding to the second wavelength band group.

The second mask data may further include third mask information obtained by synthesizing pieces of information. Each of the pieces of information indicates a spatial distribution of the spectral transmittance in a corresponding wavelength band included in a non-designated wavelength region other than the designated wavelength region in the target wavelength region.

The second mask data need not include information concerning a spatial distribution of the spectral transmittance in a corresponding wavelength band included in a non-designated wavelength region other than the designated wavelength region.

A signal processing method according to still another embodiment of the present disclosure includes acquiring compressed image data including two-dimensional image information of a subject obtained by compressing hyper-spectral information in a target wavelength region; acquiring reference spectrum data including information on one or more spectra associated with the subject; and displaying, on a display, a graphical user interface for designating a reconstruction condition for generating pieces of two-dimensional image data corresponding to designated wavelength bands from the compressed image data and an image based on the reference spectrum data.

According to the above arrangement, a user can designate a reconstruction condition for generating pieces of two-dimensional image data corresponding to designated wavelength bands. This makes it possible to efficiently generate pieces of two-dimensional image data corresponding to desired designated wavelength bands.

The present disclosure includes a computer program for causing a computer to execute each of the above methods. The present disclosure also includes a signal processing apparatus that includes a processor that executes each of the above methods and a memory in which a computer program executed by the processor is stored. The following describes embodiments of the present disclosure in more detail. The embodiments below are merely illustrative, and can be modified and changed in various ways.

Embodiment 1

1. Imaging System

First, a configuration example of an imaging system used in an exemplary embodiment of the present disclosure is described.

FIG. 1A schematically illustrates a configuration example of the imaging system. This system includes an imaging device 100 and a processing apparatus 200. The imaging device 100 includes a similar configuration to the imaging device disclosed in Patent Literature 1. The imaging device 100 includes an optical system 140, a filter array 110, and an image sensor 160. The optical system 140 and the filter array 110 are disposed on an optical path of light incident from a target 70, which is a subject. The filter array 110 in the example of FIG. 1A is disposed between the optical system 140 and the image sensor 160.

In FIG. 1A, an apple is illustrated as an example of the target 70. The target 70 is not limited to an apple and can be any object. The image sensor 160 generates data of a compressed image 10 that is information on wavelength bands compressed as a two-dimensional monochromatic image. The processing apparatus 200 can generate image data for each of wavelength bands included in a predetermined target wavelength region on the basis of the data of the compressed image 10 generated by the image sensor 160. The generated pieces of image data that correspond to the wavelength bands on a one-to-one basis are sometimes referred to as a "hyperspectral (HS) data cube" or "hyperspectral image data". It is assumed here that the number of wavelength bands included in the target wavelength region is N (N is an integer of 4 or more). In the following description, the generated pieces of image data that correspond to the wavelength bands on a one-to-one basis are referred to as a reconstructed image 20$W_1$, a reconstructed image 20$W_2$, . . . , and a reconstructed image 20$W_N$, which are sometimes collectively referred to as a "hyperspectral image 20". Data of the reconstructed images of the respective wavelength bands are sometimes referred to as "spectral image data" or simply as "spectral images". Hereinafter, image data or signals, that is, a collection of data or signals indicative of pixel values of pixels included in an image is sometimes referred to simply as an "image".

The "target wavelength region" in the present disclosure refers to a wavelength range decided by an upper-limit wavelength and a lower-limit wavelength of wavelength components included in spectral images output by the system. The target wavelength region may correspond to a wavelength region of light that can be detected by a photodetection device such as an image sensor in the system. For example, in a case of a system that performs imaging through a bandpass filter that suppresses transmission of light other than 400 nm to 700 nm, the target wavelength region can be 400 nm to 700 nm. In a case of a system that performs imaging additionally through a filter that absorbs light of 500 nm to 600 nm, the target wavelength region can be a wavelength region combining 400 nm to 500 nm and 600 nm to 700 nm that can be detected by a photodetection device.

The filter array 110 according to the present embodiment is an array of light-transmitting filters that are arranged in rows and columns. The filters include kinds of filters that are different from each other in spectral transmittance, that is, wavelength dependence of light transmittance. The filter array 110 functions as the coding mask described above, and outputs incident light after modulating an intensity of the incident light for each wavelength.

In the example illustrated in FIG. 1A, the filter array 110 is disposed in the vicinity of or directly above the image sensor 160. The "vicinity" as used herein means being close to such a degree that an image of light from the optical system 140 is formed on a surface of the filter array 110 in a certain level of clarity. The "directly above" means that the filter array 110 and the image sensor 160 are disposed close to such a degree that almost no gap is formed therebetween. The filter array 110 and the image sensor 160 may be integral with each other.

The optical system 140 includes at least one lens. Although the optical system 140 is illustrated as a single lens in FIG. 1A, the optical system 140 may be a combination of lenses. The optical system 140 forms an image on an imaging surface of the image sensor 160 through the filter array 110.

Figure 1B:
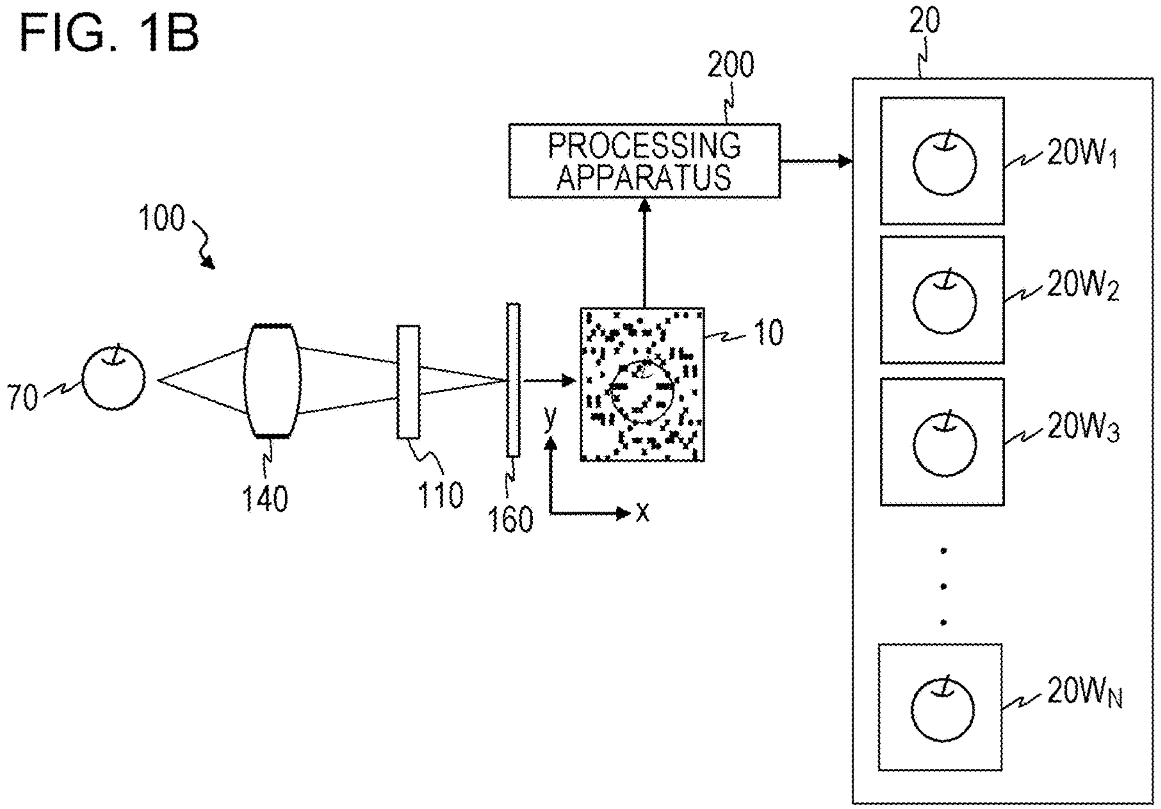
FIG. 1B schematically illustrates another configuration example of the imaging system.
Figure 1C:
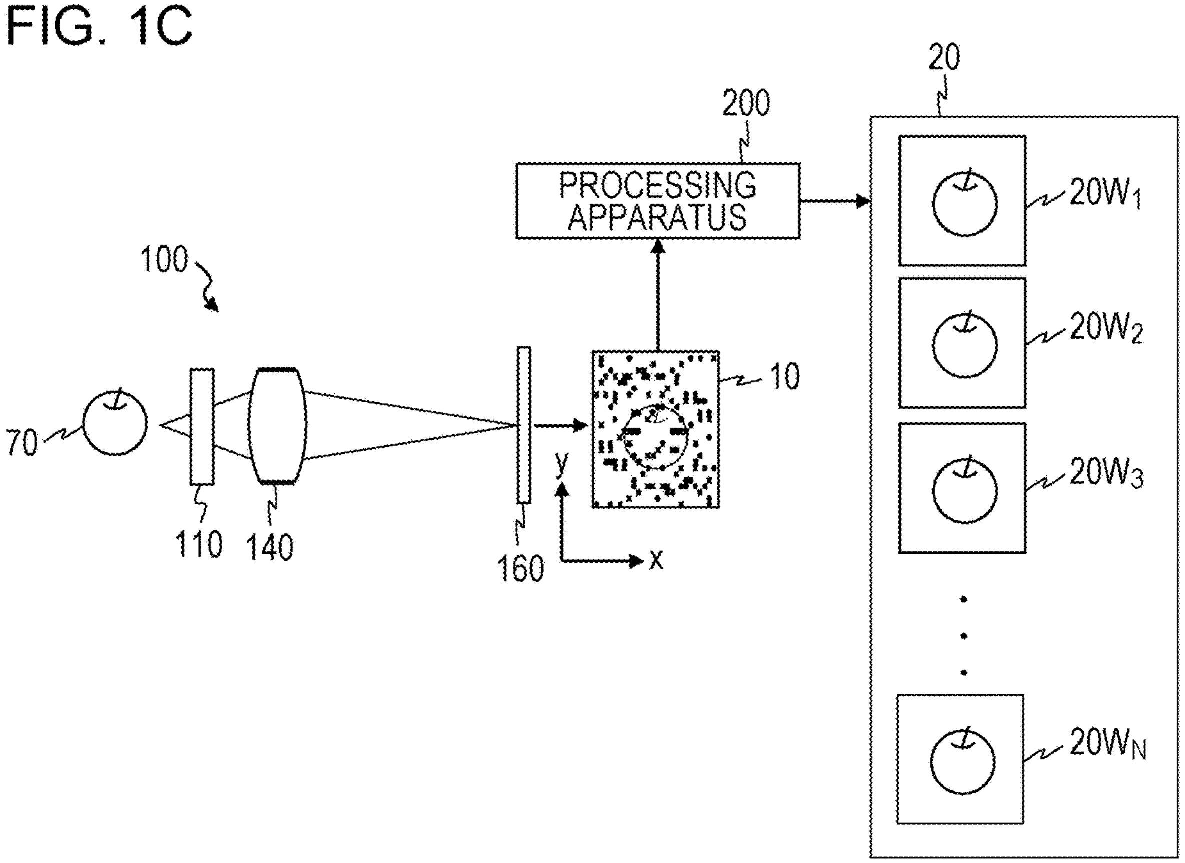
FIG. 1C schematically illustrates still another configuration example of the imaging system.
Figure 1D:
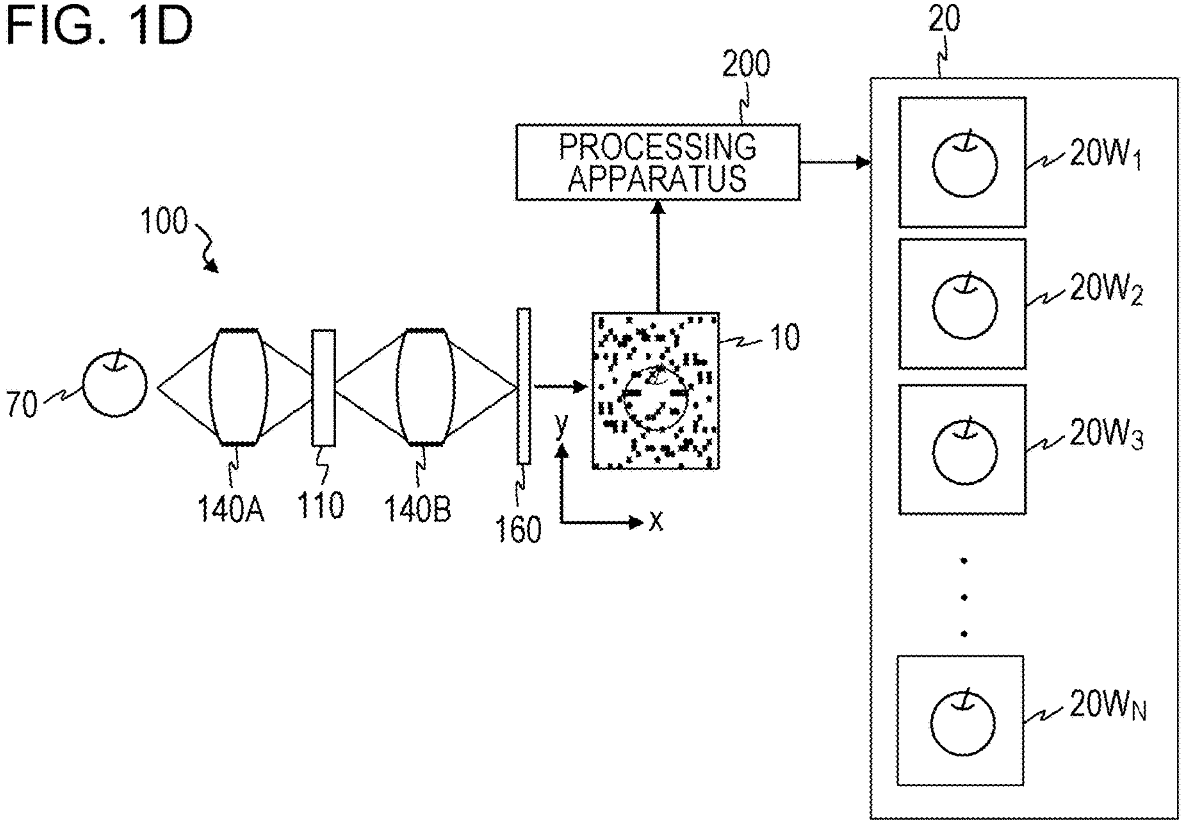
FIG. 1D schematically illustrates still another configuration example of the imaging system.

The filter array 110 may be disposed away from the image sensor 160. FIGS. 1B to 1D illustrate a configuration example of the imaging device 100 in which the filter array 110 is disposed away from the image sensor 160. In the example of FIG. 1B, the filter array 110 is disposed between the optical system 140 and the image sensor 160 away from the image sensor 160. In the example of FIG. 1C, the filter array 110 is disposed between the target 70 and the optical system 140. In the example of FIG. 1D, the imaging device 100 includes two optical systems 140A and 140B, and the filter array 110 is disposed between the optical systems 140A and 140B. As in these examples, an optical system including one or more lenses may be disposed between the filter array 110 and the image sensor 160.

The image sensor 160 is a monochromatic photodetector that has photodetection elements (hereinafter also referred to as "pixels") that are arranged two-dimensionally. The image sensor 160 can be, for example, a charge-coupled device (CCD), a complementary metal oxide semiconductor (CMOS) sensor, or an infrared array sensor. Each of the photodetection elements includes, for example, a photodiode. The image sensor 160 need not necessarily be a monochromatic sensor. For example, a color-type sensor may be used. The color-type sensor includes a sensor that has a filter that allows red light to pass therethrough, a filter that allows green light to pass therethrough, and a filter that allows blue light to pass therethrough, a sensor that has a filter that allows red light to pass therethrough, a filter that allows green light to pass therethrough, a filter that allows blue light to pass therethrough, and a filter that allows an infrared ray to pass therethrough, or a sensor that has a filter that allows red light to pass therethrough, a filter that allows green light to pass therethrough, a filter that allows blue light to pass therethrough, and a filter that allows white light to pass therethrough. Use of a color-type sensor can increase an amount of information concerning a wavelength and can improve accuracy of reconstruction of the hyperspectral image 20. A wavelength range to be acquired may be any wavelength range, and is not limited to a visible wavelength range and may be a wavelength range such as an ultraviolet wavelength range, a near-infrared wavelength range, a mid-infrared wavelength range, or a far-infrared wavelength range.

The processing apparatus 200 can be a computer including one or more processors and one or more storage media such as a memory. The processing apparatus 200 generates data of the reconstructed image 20$W_1$, the reconstructed image 20$W_2$, . . . , and the reconstructed image 20$W_N$ on the basis of the compressed image 10 acquired by the image sensor 160.

Figure 2A:
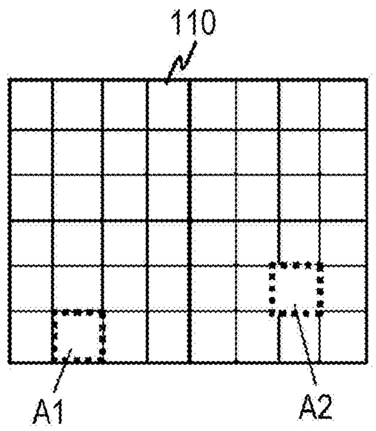
FIG. 2A schematically illustrates an example of a filter array.

FIG. 2A schematically illustrates an example of the filter array 110. The filter array 110 has regions arranged two-dimensionally. Hereinafter, each of the regions is sometimes referred to as a "cell". In each of the regions, an optical filter having individually set spectral transmittance is disposed. The spectral transmittance is expressed as a function T ($\lambda$) where $\lambda$ is a wavelength of incident light. The spectral transmittance T ($\lambda$) can take a value greater than or equal to 0 and less than or equal to 1.

In the example illustrated in FIG. 2A, the filter array 110 has 48 rectangular regions arranged in 6 rows and 8 columns. This is merely an example, and a larger number of regions can be provided in actual use. For example, the number of regions may be similar to the number of pixels of the image sensor 160. The number of filters included in the filter array 110 is, for example, decided within a range from tens of filters to tens of millions of filters.

Figure 2B:
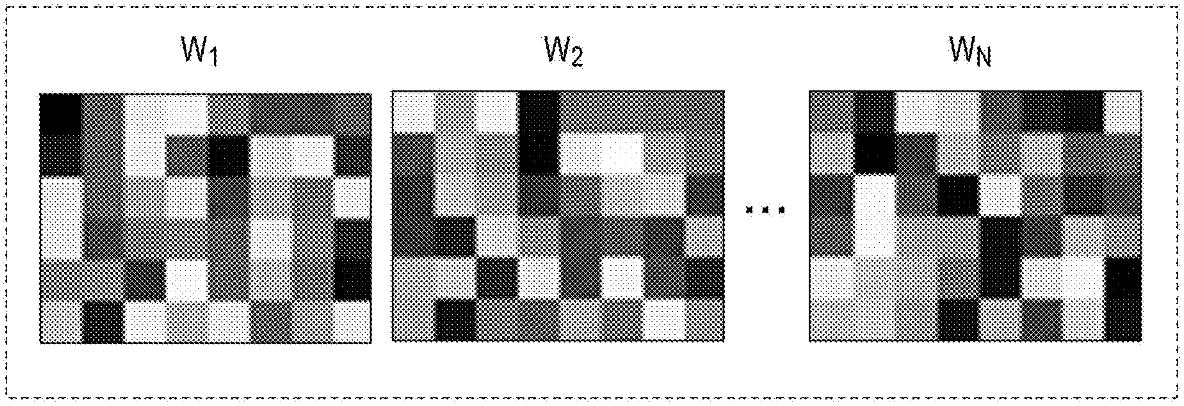
FIG. 2B illustrates an example of a spatial distribution of light transmittance of each of wavelength bands included in a target wavelength region.

FIG. 2B illustrates an example of a spatial distribution of transmittance of light of each of the wavelength bands $W_1$, $W_2$, . . . , and $W_N$ included in the target wavelength region. In the example illustrated in FIG. 2B, differences in density among regions represent differences in transmittance. A paler region has higher transmittance, and a deeper region has lower transmittance. As illustrated in FIG. 2B, a spatial distribution of light transmittance varies depending on a wavelength band.

Figure 2C:
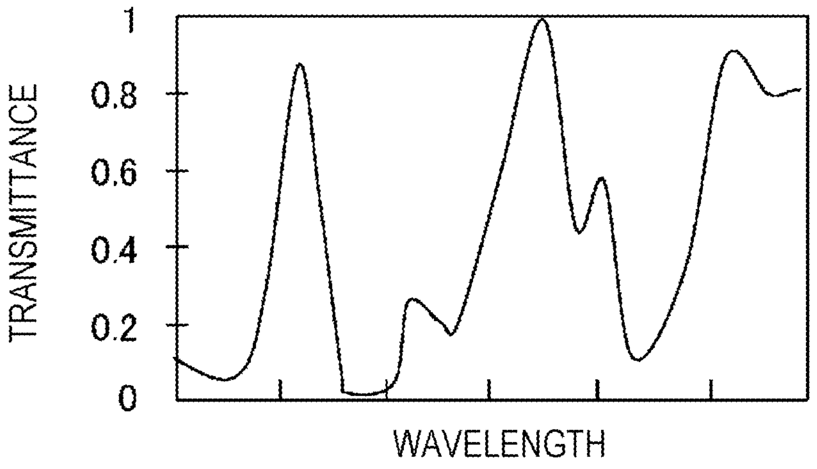
FIG. 2C illustrates an example of spectral transmittance of a region A1 included in the filter array illustrated in FIG. 2A.
Figure 2D:
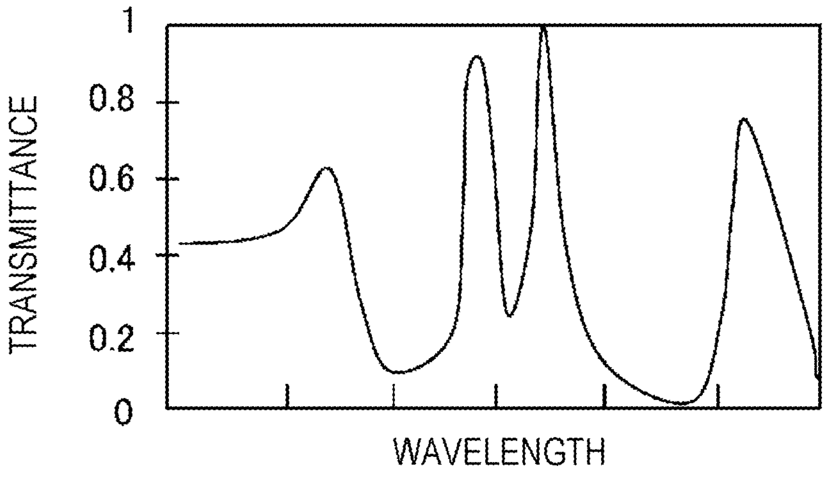
FIG. 2D illustrates an example of spectral transmittance of a region A2 included in the filter array illustrated in FIG. 2A.

FIGS. 2C and 2D illustrate an example of spectral transmittance of a region A1 and an example of spectral transmittance of a region A2 included in the filter array 110 illustrated in FIG. 2A, respectively. The spectral transmittance of the region A1 and the spectral transmittance of the region A2 are different from each other. That is, the spectral transmittance of one region included in the filter array 110 varies from another region included in the filter array 110. However, not all regions need to be different in spectral transmittance. In the filter array 110, at least some of the regions are different from each other in spectral transmittance. The filter array 110 includes two or more filters that are different from each other in spectral transmittance. In one example, the number of patterns of spectral transmittance of the regions included in the filter array 110 can be identical to or larger than the number N of wavelength bands included in the target wavelength region. The filter array 110 may be designed so that half or more of the regions is different in spectral transmittance.

Figure 3A:
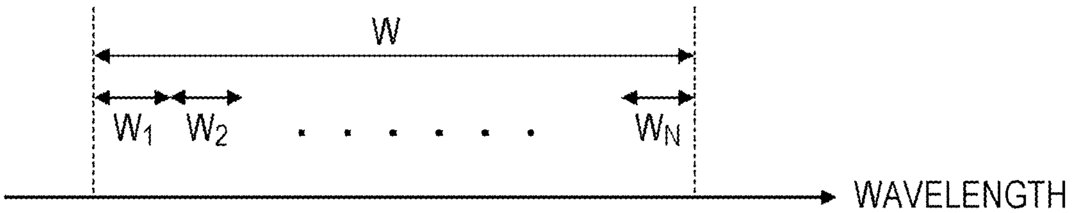
FIG. 3A is a view for explaining an example of a relationship between a target wavelength region and wavelength bands included in the target wavelength region.
Figure 3B:
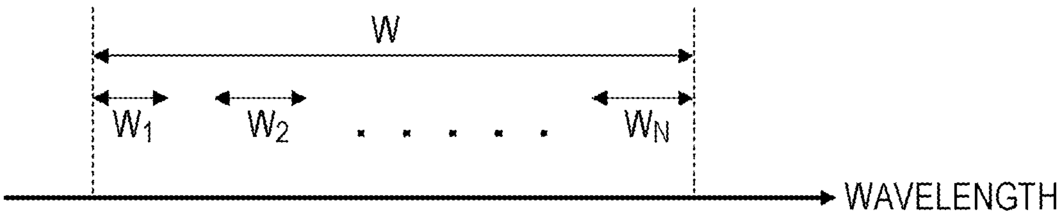
FIG. 3B is a view for explaining another example of a relationship between a target wavelength region and wavelength bands included in the target wavelength region.

FIGS. 3A and 3B are views for explaining a relationship between the target wavelength region W and the wavelength bands $W_1$, $W_2$, . . . , and $W_N$ included in the target wavelength region W. The target wavelength region W can be set to various ranges depending on use. The target wavelength region W can be, for example, a wavelength region of visible light of approximately 400 nm to approximately 700 nm, a wavelength region of a near-infrared ray of approximately 700 nm to approximately 2500 nm, or a wavelength region of a near-ultraviolet ray of approximately 10 nm to approximately 400 nm. Alternatively, the target wavelength region W may be a wavelength region such as a mid-infrared wavelength region or a far-infrared wavelength region. That is, a wavelength region used is not limited to a visible light region. Hereinafter, not only visible light, but also all kinds of radiation including an infrared ray and an ultraviolet ray are referred to as "light".

In the example illustrated in FIG. 3A, N wavelength regions obtained by equally dividing the target wavelength region W are the wavelength band $W_1$, the wavelength band $W_2$, . . . , and the wavelength band $W_N$ where N is an integer of 4 or more. However, such an example is not restrictive. The wavelength bands included in the target wavelength region W may be set in any ways. For example, the wavelength bands may have non-uniform bandwidths. A gap may be present between adjacent wavelength bands or adjacent wavelength bands may overlap each other. In the example illustrated in FIG. 3B, a bandwidth varies from one wavelength band to another and a gap is present between adjacent two wavelength bands. In this way, the wavelength bands can be decided in any way.

Figure 4A:
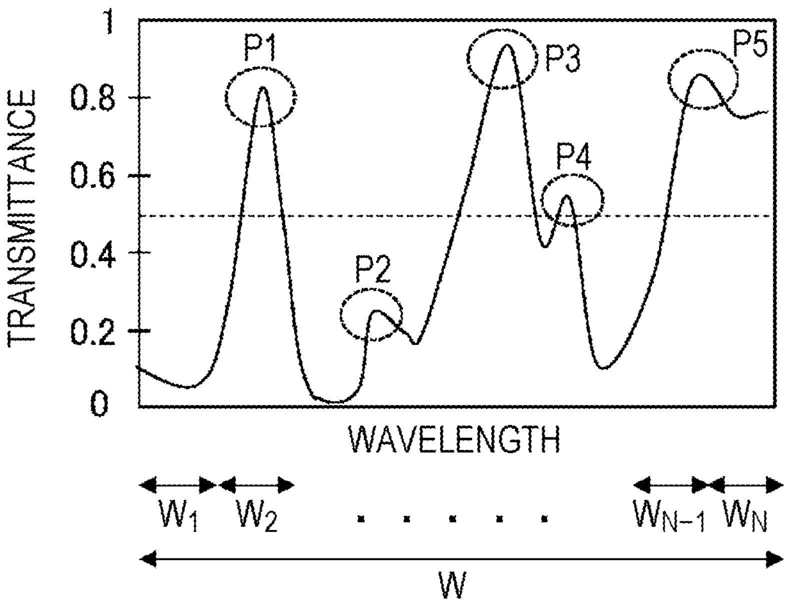
FIG. 4A is a view for explaining characteristics of spectral transmittance in a region of the filter array.

FIG. 4A is a view for explaining characteristics of spectral transmittance in a region of the filter array 110. In the example illustrated in FIG. 4A, the spectral transmittance has local maximum values (i.e., local maximum values P1 to P5) and minimum values concerning wavelengths within the target wavelength region W. In the example illustrated in FIG. 4A, normalization is performed so that a maximum value of light transmittance within the target wavelength region W is 1 and a minimum value of light transmittance within the target wavelength region W is 0. In the example illustrated in FIG. 4A, the spectral transmittance has a local maximum value in each of the wavelength regions such as the wavelength band $W_2$ and a wavelength band $W_{N-1}$. In this way, spectral transmittance of each region can be designed in such a manner that at least two wavelength regions among the wavelength bands $W_1$ to $W_N$ each have a local maximum value. In the example of FIG. 4A, the local maximum value P1, the local maximum value P3, the local maximum value P4, and the maximum value P5 are 0.5 or more.

As described above, light transmittance of each region varies depending on a wavelength. Therefore, the filter array 110 allows a component of a certain wavelength region of incident light to pass therethrough much and hardly allows a component of another wavelength region to pass therethrough. For example, transmittance of light of k wavelength bands among the N wavelength bands can be larger than 0.5, and transmittance of light of remaining N−k wavelength regions can be less than 0.5. k is an integer that satisfies $2 \le k < N$. If incident light is white light equally including all visible light wavelength components, the filter array 110 modulates, for each region, the incident light into light having discrete intensity peaks concerning wavelengths and superimposes and outputs the light of multiple wavelengths.

Figure 4B:
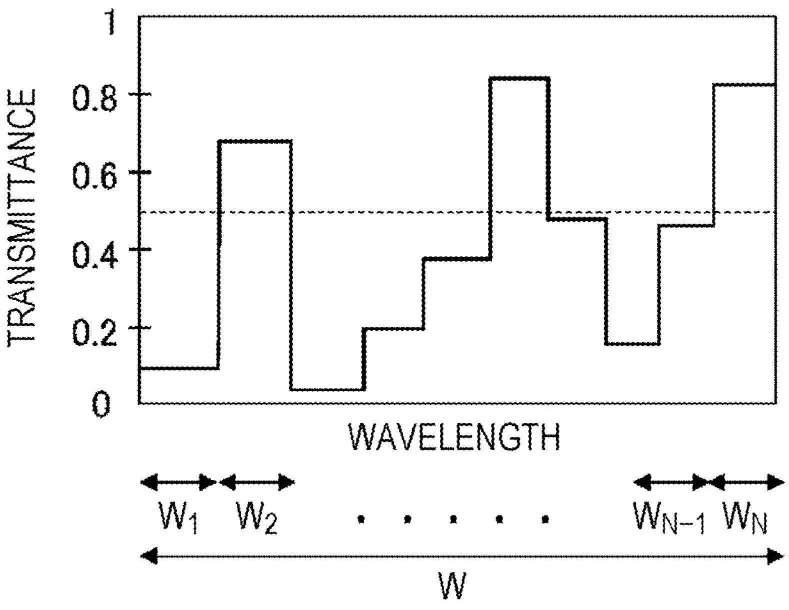
FIG. 4B illustrates a result of averaging the spectral transmittance illustrated in FIG. 4A for each wavelength band.

FIG. 4B illustrates, for example, a result of averaging the spectral transmittance illustrated in FIG. 4A for each of the wavelength band $W_1$, the wavelength band $W_2$, . . . , and the wavelength band $W_N$. The averaged transmittance is obtained by integrating the spectral transmittance T (λ) for each wavelength band and dividing the integrated spectral transmittance T (λ) by a bandwidth of the wavelength band. Hereinafter, a value of the averaged transmittance for each wavelength band is used as transmittance in the wavelength band. In this example, transmittance is markedly high in three wavelength regions that take the local maximum values P1, P3, and P5. In particular, transmittance is higher than 0.8 in two wavelength regions that take the local maximum values P3 and P5.

In the example illustrated in FIGS. 2A to 2D, a gray-scale transmittance distribution in which transmittance of each region can take any value greater than or equal to 0 and less than or equal to 1 is assumed. However, the transmittance distribution need not necessarily be a gray-scale transmittance distribution. For example, a binary-scale transmittance distribution in which transmittance of each region can take either almost 0 or almost 1 may be employed. In the binary-scale transmittance distribution, each region allows transmission of a large part of light of at least two wavelength regions among wavelength regions included in the target wavelength region and does not allow transmission of a large part of light of a remaining wavelength region. The "large part" refers to approximately 80% or more.

A certain cell among all cells, for example, a half of all the cells may be replaced with a transparent region. Such a transparent region allows transmission of light of all of the wavelength bands $W_1$ to $W_N$ included in the target wavelength region W at equally high transmittance, for example, transmittance of 80% or more. In such a configuration, transparent regions can be, for example, disposed in a checkerboard pattern. That is, a region in which light transmittance varies depending on a wavelength and a transparent region can be alternately arranged in two alignment directions of the regions of the filter array 110.

Data indicative of such a spatial distribution of spectral transmittance of the filter array 110 is acquired in advance on the basis of design data or actual calibration and is stored in a storage medium included in the processing apparatus 200. This data is used for arithmetic processing which will be described later.

The filter array 110 can be, for example, constituted by a multi-layer film, an organic material, a diffraction grating structure, or a microstructure containing a metal. In a case where a multi-layer film is used, for example, a dielectric multi-layer film or a multi-layer film including a metal layer can be used. In this case, the filter array 110 is formed so that at least one of a thickness, a material, and a laminating order of each multi-layer film varies from one cell to another. This can realize spectral characteristics that vary from one cell to another. Use of a multi-layer film can realize sharp rising and falling in spectral transmittance. A configuration using an organic material can be realized by varying contained pigment or dye from one cell to another or laminating different kinds of materials. A configuration using a diffraction grating structure can be realized by providing a diffraction structure having a diffraction pitch or depth that varies from one cell to another. In a case where a microstructure containing a metal is used, the filter array 110 can be produced by utilizing dispersion of light based on a plasmon effect.

Next, an example of signal processing performed by the processing apparatus 200 is described. The processing apparatus 200 generates the hyperspectral image 20 on the basis of the compressed image 10 output from the image sensor 160 and spatial distribution characteristics of transmittance for each wavelength of the filter array 110. The generated hyperspectral image 20 includes images. The images correspond to wavelength regions, and the number of wavelength regions is, for example, larger than three, which is the number of wavelength regions (e.g., a wavelength region of red light, a wavelength region of green light, and a wavelength region of blue light) acquired by a general color camera. The number of wavelength regions can be, for example, 4 to approximately 100. The number of wavelength regions is referred to as "the number of bands". The number of bands may be larger than 100 depending on intended use.

Data to be obtained is data of the hyperspectral image 20, which is expressed as f. The data f is data including image data $f_1$ corresponding to the wavelength band $W_1$, the image data $f_2$ corresponding to the wavelength band $W_2$, . . . , and image data $f_N$ corresponding to the wavelength band $W_N$ where N is the number of bands. It is assumed here that a lateral direction of the image is an x direction and a longitudinal direction of the image is a y direction, as illustrated in FIGS. 1A to 1D. Each of the image data $f_1$, $f_2$, . . . , and $f_N$ is two-dimensional data of n×m pixels where m is the number of pixels of the image data to be obtained in the x direction and n is the number of pixels of the image data to be obtained in the y direction. Accordingly, the data f is three-dimensional data that has n×m×N elements. This three-dimensional data is referred to as "hyperspectral image data" or a "hyperspectral data cube". Meanwhile, the number of elements of data g of the compressed image 10 acquired by coding and multiplexing by the filter array 110 is n×m. The data g can be expressed by the following formula (1).

$$g = Hf = H\begin{bmatrix} f_1 \\ f_2 \\ \vdots \\ f_N \end{bmatrix} \tag{1}$$

In the formula (1), each of $f_1$, $f_2$, . . . , and $f_N$ is data having n×m elements. Accordingly, a vector of the right side is a one-dimensional vector of n×m×N rows and 1 column. The compressed image 10 is converted into a one-dimensional vector g of n×m rows and 1 column, and is calculated. A matrix H represents conversion of performing coding and intensity modulation of components $f_1$, $f_2$, . . . , and $f_N$ of the vector f by using different pieces of coding information (also referred to as "mask information") for the respective wavelength bands and adding results thus obtained. Accordingly, H is a matrix of n×m rows and n×m×N columns. The mask information may be interpreted as the matrix H in the formula (1).

It seems that when the vector g and the matrix H are given, the data f can be calculated by solving an inverse problem of the formula (1). However, since the number of elements n×m×N of the data f to be obtained is larger than the number of elements n×m of the acquired data g, this problem is an ill-posed problem and cannot be solved. In view of this, the processing apparatus 200 finds a solution by using a method of compressed sensing while utilizing redundancy of the images included in the data f. Specifically, the data f to be obtained is estimated by solving the following formula (2).

$$f' = \arg\min_{f}\{\|g - Hf\|_{l_2} + \tau\Phi(f)\} \quad (2)$$

In the formula (2), f represents the estimated data f. The first term in the parentheses in the above formula represents a difference amount between an estimation result Hf and the acquired data g, that is, a residual term. Although a sum of squares is a residual term in this formula, an absolute value, a square-root of sum of squares, or the like may be a residual term. The second term in the parentheses is a regularization term or a stabilization term. The formula (2) means that f that minimizes a sum of the first term and the second term is found. The function in the parentheses in the formula (2) is called an evaluation function. The processing apparatus 200 can calculate, as the final solution f', f that minimizes the evaluation function by convergence of solutions by recursive iterative operation.

The first term in the parentheses in the formula (2) means operation of finding a sum of squares of a difference between the acquired data g and Hf obtained by converting f in the estimation process by the matrix H. Φ(f) in the second term is a constraint condition in regularization of f and is a function reflecting sparse information of the estimated data. This function brings an effect of smoothing or stabilizing the estimated data. The regularization term can be, for example, expressed by discrete cosine transform (DCT), wavelet transform, Fourier transform, total variation (TV), or the like of f. For example, in a case where total variation is used, stable estimated data with suppressed influence of noise of the observed data g can be acquired. Sparsity of the target 70 in the space of the regularization term varies depending on texture of the target 70. A regularization term that makes the texture of the target 70 more sparse in the space of the regularization term may be selected. Alternatively, regularization terms may be included in calculation. τ is a weight coefficient. As the weight coefficient τ becomes larger, an amount of reduction of redundant data becomes larger, and a compression rate increases. As the weight coefficient τ becomes smaller, convergence to a solution becomes weaker. The weight coefficient τ is set to such a proper value that f converges to a certain extent and is not excessively compressed.

g included in the formulas (1) and (2) is sometimes expressed as g in descriptions related to the formulas (1) and (2).

Note that in the configurations of FIG. 1B and FIG. 1C, an image coded by the filter array 110 is acquired in a blurred state on the imaging surface of the image sensor 160. Therefore, the hyperspectral image 20 can be generated by holding the blur information in advance and reflecting the blur information in the matrix H. The blur information is expressed by a point spread function (PSF). The PSF is a function that defines a degree of spread of a point image to surrounding pixels. For example, in a case where a point image corresponding to 1 pixel on an image spreads to a region of k×k pixels around the pixel due to blurring, the PSF can be defined as a coefficient group, that is, as a matrix indicative of influence on a pixel value of each pixel within the region. The hyperspectral image 20 can be generated by reflecting influence of blurring of a coding pattern by the PSF in the matrix H. Although the filter array 110 can be disposed at any position, a position where the coding pattern of the filter array 110 does not disappear due to excessive spread can be selected.

2. Band Synthesizing Processing Based on Reference Spectrum

By the above processing, images of wavelength bands can be generated from the compressed image 10 acquired by the image sensor 160. However, to generate images of all wavelength bands included in a target wavelength region, it is necessary to perform computation using a matrix including as many elements as a product of the number of pixels of the image sensor 160 and the number of wavelength bands. Since a load of this computation is high, the processing apparatus 200 needs high computing power.

There are cases where a light emission spectrum or an absorption spectrum assumed for a substance of an observation target is known such as fluorescent observation and absorption spectrum observation. In such cases, a computation amount can be reduced by editing or deleting mask data on the basis of the assumed known spectrum.

An example of a method for lessening a load of arithmetic processing by using reference spectrum data indicative of a known spectrum is described below. An example of a reference spectrum illustrated below is merely a representative example, and can be modified or changed in various ways. In the following description, for example, a system for imaging a subject containing one or more kinds of specific substances (e.g., a fluorescent substance) and analyzing or classifying the substance on the basis of an acquired image is described.

Figure 5:
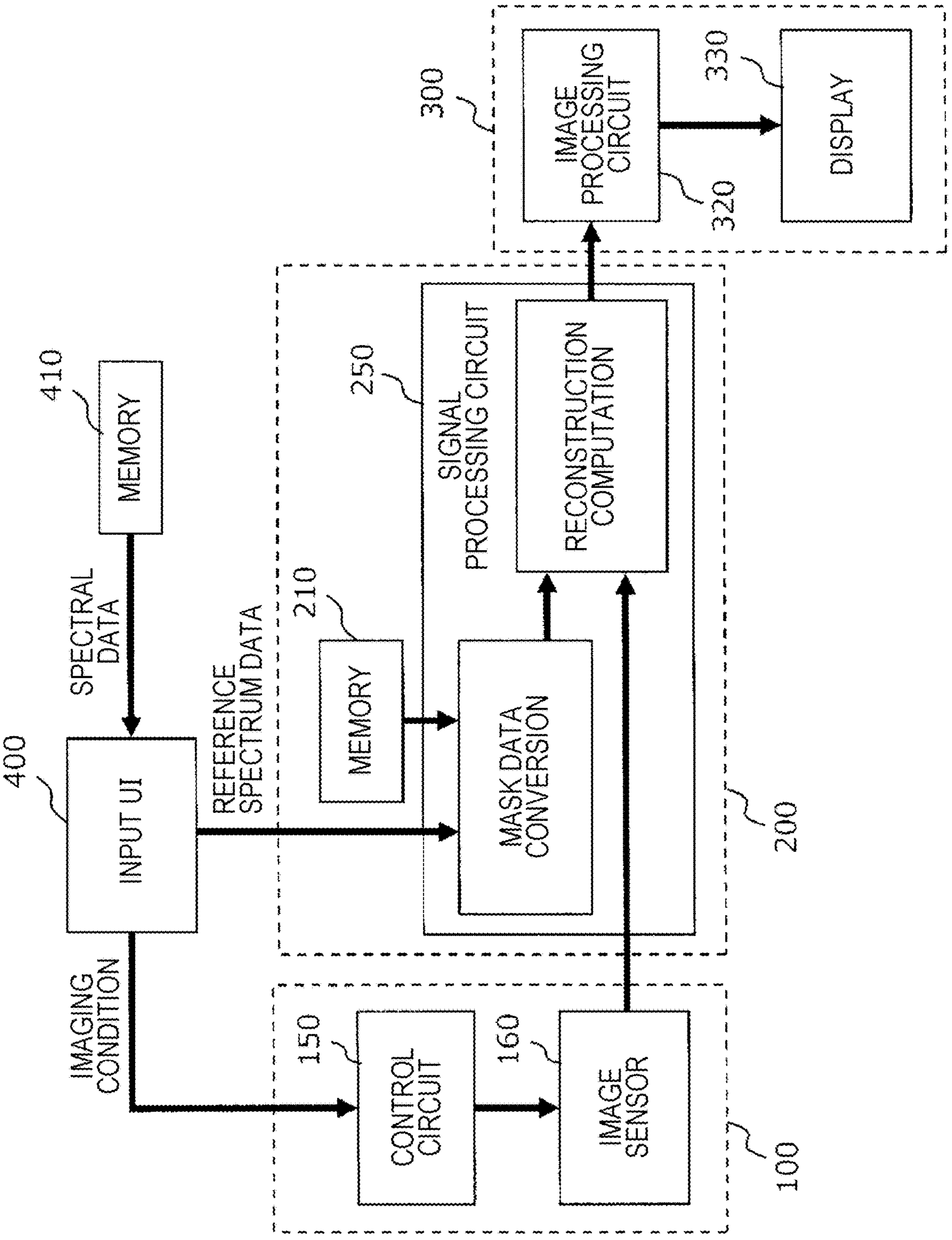
FIG. 5 is a block diagram illustrating a configuration example of a system for lessening a load of arithmetic processing.

FIG. 5 is a block diagram illustrating a configuration example of a system for lessening a load of arithmetic processing by using reference spectrum data. This system includes the imaging device 100, the processing apparatus 200, a display device 300, and an input user interface (UI) 400. The processing apparatus 200 is an example of a signal processing apparatus in the present disclosure.

The imaging device 100 includes the image sensor 160 and a control circuit 150 that controls the image sensor 160. As illustrated in FIGS. 1A to 1D, the imaging device 100 includes the filter array 110 and at least one optical system 140. The image sensor 160 acquires a compressed image that is a monochromatic image based on light whose intensity has been modulated for each region by the filter array 110. In data of each pixel of the compressed image, pieces of information on wavelength bands included in a target wavelength region are superimposed. It can therefore be said that this compressed image is hyperspectral information within the target wavelength region compressed as two-dimensional image information. Hereinafter, data indicative of a compressed image is referred to as "compressed image data".

The processing apparatus 200 includes a signal processing circuit 250 and a memory 210 such as a RAM and a ROM. The signal processing circuit 250 can be an integrated circuit including a processor such as a CPU or a GPU. The signal processing circuit 250 performs reconstruction processing based on the compressed image data output from the image sensor 160. The memory 210 stores therein a computer program executed by the processor included in the signal processing circuit 250, various kinds of data referred to by the signal processing circuit 250, and various kinds of data generated by the signal processing circuit 250. The memory 210 stores therein mask data reflecting a spatial distribution of spectral transmittance of the filter array 110 in the imaging device 100. The mask data is data including information indicative of the matrix in the above formulas (1) and (2) or information (hereinafter referred to as "mask matrix information") for deriving the matrix. The mask matrix information can be information in a matrix format having elements according to spatial distributions of transmittance of the filter array 110 concerning respective unit bands included in the target wavelength region or a format similar to a matrix. The mask data is prepared in advance and is stored in the memory 210.

The display device 300 includes an image processing circuit 320 and a display 330. The image processing circuit 320 performs necessary processing on an image generated by the signal processing circuit 250 and then causes the image to be displayed on the display 330. The display 330 can be, for example, any display such as a liquid crystal display or an organic LED (OLED) display.

The input UI 400 includes hardware and software for setting various conditions such as an imaging condition. The input UI 400 can include an input device such as a keyboard and a mouse. The input UI 400 may be a device that enables both input and output, such as a touch screen. In this case, the touch screen may also function as the display 330. The imaging condition can include conditions such as resolution, gain, and an exposure period. The input imaging condition is sent to the control circuit 150 of the imaging device 100. The control circuit 150 causes the image sensor 160 to perform imaging in accordance with the imaging condition.

The memory 410 stores therein spectral data. The spectral data includes information on a spectrum assumed for one or more kinds of substances that can be contained in the subject. The spectral data is prepared in advance for each substance and is recorded in the memory 410. The memory 410 may be an external memory or may be incorporated into the imaging device 100. The spectral data may be, for example, acquired by being downloaded over a network such as the Internet.

The user can select specific spectral data as reference spectrum data by operating the input UI 400. For example, the user selects a specific material or substance on the input UI 400, and thereby spectral data corresponding to the material or substance can be decided as reference spectrum data. When reference spectrum data is decided by a user's operation, the reference spectrum data is sent to the signal processing circuit 250.

The signal processing circuit 250 decides a mask data synthesis condition on the basis of the reference spectrum data. The mask data synthesis condition is a condition for deciding designated wavelength bands on which reconstruction processing is performed. In other words, the signal processing circuit 250 decides designated wavelength bands on which reconstruction processing is performed on the basis of the reference spectrum data. A wavelength region constituted by the designated wavelength bands is referred to as a "designated wavelength region". The signal processing circuit 250 may automatically decide the synthesis condition on the basis of the reference spectrum data or may decide the synthesis condition in accordance with a condition designated by using the input UI 400 by the user. The synthesis condition defines which unit bands among the unit bands included in the target wavelength region are synthesized into a single band. Each of the unit bands is a wavelength band of a narrow bandwidth included in the target wavelength region. For example, in observation of a sample containing one or more substances, unit bands included in a wavelength region of relatively low importance can be synthesized as a single band. Alternatively, unit bands included in a wavelength region assumed to represent characteristics of an individual substance the most can be synthesized as a single band. A synthesized relatively wide band is hereinafter sometimes referred to as a "synthesized band". Furthermore, image data corresponding to the synthesized band is sometimes referred to as synthesized image data. The synthesis condition may include information on a wavelength region on which reconstruction processing is not performed. For example, a computation load can be reduced by omitting reconstruction processing as for a unit band included in a wavelength region of low importance in observation.

The signal processing circuit 250 converts the mask data into mask data of a smaller size on the basis of the decided synthesis condition and the mask data stored in the memory 210. Hereinafter, the mask data before conversion is referred to as "first mask data", and the mask data after conversion is referred to as "second mask data". The first mask data can be used to generate first spectral image data corresponding to a first wavelength band group in the target wavelength region. The first wavelength band group can be, for example, a group of unit bands included in the target wavelength region. The first spectral image data can be data including image information of each of the unit bands included in the first wavelength band group. The second mask data can be used to generate second spectral image data corresponding to a second wavelength band group in one or more designated wavelength regions. The second wavelength band group can be a group of unit bands included in the designated wavelength region. The second spectral image data can be data including image information of each of the unit bands included in the designated wavelength region. The first mask data can include first mask information indicative of a spatial distribution of spectral transmittance corresponding to the first wavelength band group in the filter array 110. The second mask data can include second mask information indicative of a spatial distribution of spectral transmittance corresponding to the second wavelength band group in the filter array 110. The second mask data can further include third mask information obtained by synthesizing pieces of information corresponding to one or more non-designated wavelength regions other than the designated wavelength region in the first mask data. Each of the pieces of information in the third mask information can indicate a spatial distribution of spectral transmittance in a corresponding unit wavelength band included in the non-designated wavelength region. It can be said that the third mask information is synthesized mask information obtained by synthesizing mask matrix information corresponding to the non-designated wavelength region (i.e., the non-designated wavelength bands) in the first mask data. In the present embodiment, the second mask data of a compressed size is generated by synthesizing pieces of information of unit bands included in the non-designated wavelength region in the first mask data. The signal processing circuit 250 generates pieces of two-dimensional image data corresponding to designated wavelength bands on the basis of the compressed image data and the second mask information in the second mask data. The signal processing circuit 250 further generates one or more pieces of synthesized image data corresponding to one or more non-designated wavelength bands on the basis of the compressed image data and the third mask information (i.e., synthesized mask information) in the second mask data.

Specifically, the signal processing circuit 250 compresses a size of the first mask data by processing such as averaging matrix elements corresponding to unit bands to be synthesized. The signal processing circuit 250 performs reconstruction computation corresponding to the above formula (2) by using the second mask data after conversion and the compressed image data output from the imaging device 100. The signal processing circuit 250 thus generates a reconstructed image (i.e., a spectral image) for each of the bands after the synthesis. The signal processing circuit 250 sends data of the generated reconstructed image to the image processing circuit 320. The image processing circuit 320 draws a reconstructed image of each of the bands after the synthesis on the display 330. The image processing circuit 320 may cause each reconstructed image to be displayed on the display 330 after performing processing such as deciding a layout within a screen, associating each reconstructed image with band information, or coloring corresponding to a wavelength.

Figure 6:
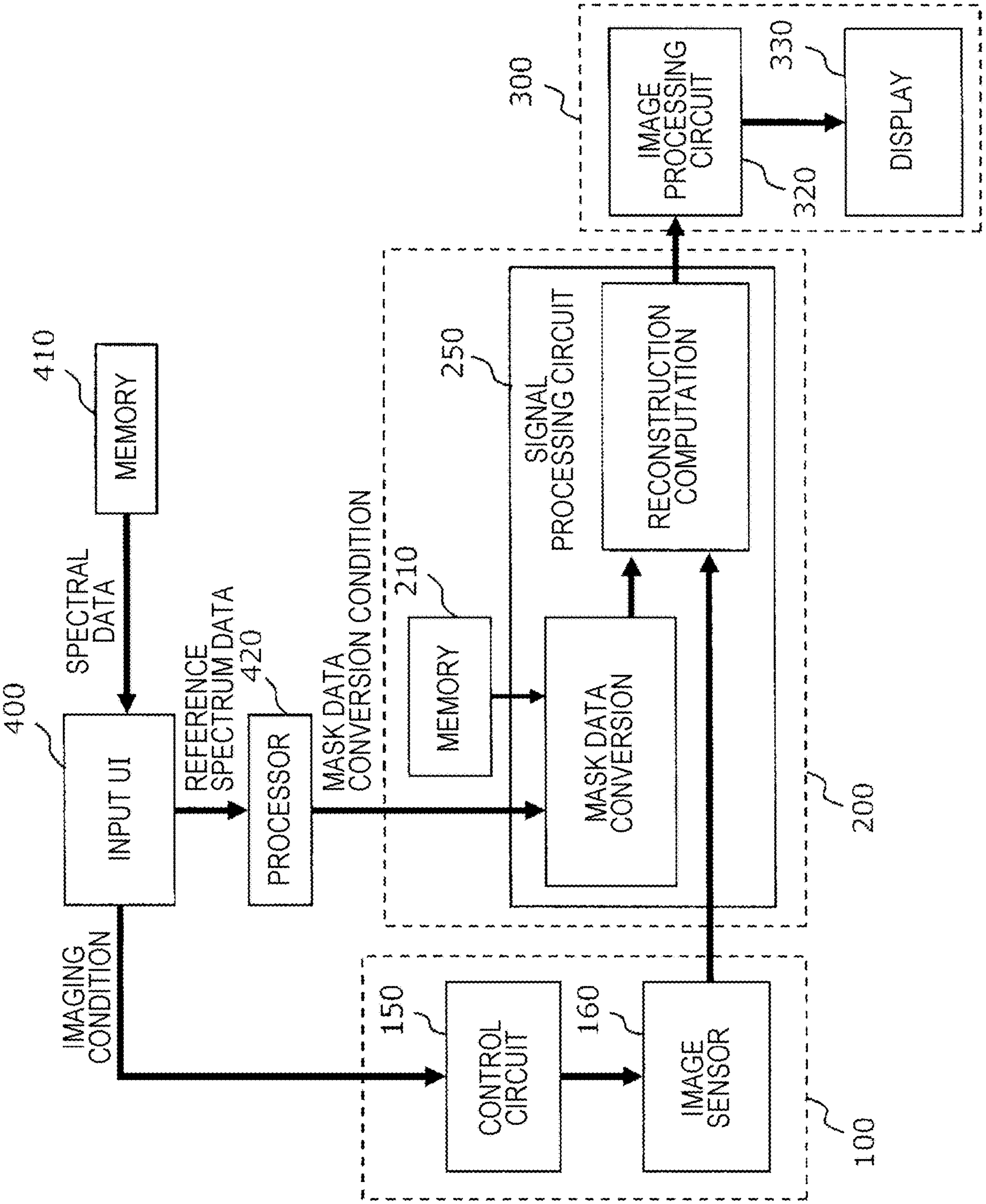
FIG. 6 illustrates a modification of the system of FIG. 5.

Although the band synthesis condition is decided on the basis of the reference spectrum data by the signal processing circuit 250 in the present embodiment, the present disclosure is not limited to such an aspect. FIG. 6 illustrates a modification of the system of FIG. 5. In this modification, a processor 420 that decides a mask data conversion condition on the basis of the reference spectrum data output from the input UI 400 is provided. The processor 420 decides a band synthesis condition on the basis of the reference spectrum data and sends, as a mask data conversion condition, the information to the signal processing circuit 250. The signal processing circuit 250 reads out information on a necessary unit band from the memory 210 in accordance with the sent mask data conversion condition. The signal processing circuit 250 constructs mask data of a compressed size from the information thus read out and generates a reconstructed image by using the mask data. According to such a configuration, it is possible to further reduce a computation load of the processing apparatus 200. The modification illustrated in FIG. 6 is also applicable to the following various embodiments.

Figure 7:
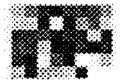
FIG. 7 illustrates an example of mask data before conversion stored in a memory.
Figure 7:
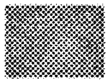
Figure 7:
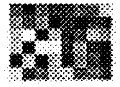
Figure 7:
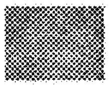
Figure 7:
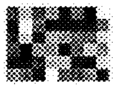
Figure 7:
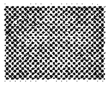
Figure 7:
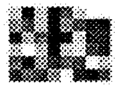
Figure 7:
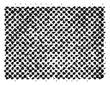
Figure 7:
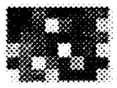
Figure 7:
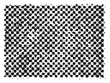

Next, a detailed example of the mask data is described with reference to FIG. 7. FIG. 7 illustrates an example of the first mask data before conversion stored in the memory 210. The first mask data in this example includes information indicative of a spatial distribution of transmittance of the filter array 110 for each of the unit bands included in the target wavelength region. The first mask data in this example includes mask information concerning each of a large number of unit bands each having 1 nm and information concerning a mask information acquisition information. Each unit band is specified by a lower-limit wavelength and an upper-limit wavelength. The mask information includes information on a mask image and a background image. The individual mask image illustrated in FIG. 7 is acquired by imaging a certain background through the filter array 110 by the image sensor 120. The background image illustrated in FIG. 7 is acquired by imaging the background without the filter array 110 by the image sensor 120. Information on such a mask image and a background image is recorded for each unit band. By dividing a value of each pixel in each mask image by a value of a corresponding pixel in a corresponding background image, a value indicative of transmittance of a corresponding filter can be calculated for each unit band.

For example, assume that the unit bands are a first unit band, . . . , a k-th unit band, . . . , and an N-th unit band. Image data fl corresponding to the first unit band is data of n×m rows and 1 column, . . . , image data fk corresponding to the k-th unit band is data of n×m rows and 1 column, . . . , and image data fN corresponding to the N-th unit band is data of n×m rows and 1 column. In this case, the formula (1) is expressed as follows:

$$g = Hf = (D_1 \ \dots \ D_k \ \dots \ D_N)\begin{pmatrix} f_1 \\ \vdots \\ f_k \\ \vdots \\ f_N \end{pmatrix} \tag{4}$$

Each of D1, Dk, . . . , and DN is a submatrix of the matrix H and may be a diagonal matrix of n×m rows and n×m columns. Examples of a case where each of these submatrices may be a diagonal matrix may include a case where it is determined that crosstalk between a pixel (p, q) and a pixel (r, s) of the image sensor 160 during actual calibration for acquiring information concerning the matrix H and crosstalk between the pixel (p, q) and the pixel (r, s) of the image sensor 160 at a time when an end user images the subject 70 are identical (1≤p, r≤n, 1≤q, s≤m, the pixel (p, q)≠the pixel (r, s)). Whether or not the condition concerning crosstalk is satisfied may be determined in consideration of an imaging environment including an optical lens and the like used during imaging or may be determined in consideration of whether or not image quality of each reconstructed image can accomplish an objective of the end user.

In a case where the filter array is irradiated with k-th light that includes light of the k-th unit band and does not include light of bands other than the k-th unit band and light output from the filter array is incident on the image sensor, data (i.e., data of a mask image) output by the image sensor is gk' (5)

In a case where the image sensor without the filter array is irradiated with k-th light that includes light of the k-th unit band and does not include light of bands other than the k-th unit band, the formula (4) is expressed by the following formula (6):

$$gk' = (D_1 \ \dots \ D_k \ \dots \ D_N)\begin{pmatrix} 0 \\ \vdots \\ 0 \\ fk' \\ 0 \\ \vdots \\ 0 \end{pmatrix} = Dkfk' \tag{6}$$

where fk' is data (i.e., data of a background image) output by the image sensor.

That is, when the formula (6) is written by using the elements of the matrix, the formula (6) is expressed by the following formula (7):

$$\begin{pmatrix} gk'(1,1) \\ \vdots \\ gk'(1,m) \\ \vdots \\ gk'(n,1) \\ \vdots \\ gk'(n,m) \end{pmatrix} = \begin{pmatrix} hk(1,1) & & 0 \\ & \ddots & \\ 0 & & hk(n\times m, n\times m) \end{pmatrix}\begin{pmatrix} fk'(1,1) \\ \vdots \\ fk'(1,m) \\ \vdots \\ fk'(n,1) \\ \vdots \\ fk'(n,m) \end{pmatrix}. \tag{7}$$

Therefore, diagonal components hk (1, 1), . . . , hk (n×m, n×m) of Dk can be found by using the data of the mask image and the data of the background image. That is, all components of the matrix H become known.

fk' (i, j) may be a pixel value of a pixel (i, j) in the background image, and gk'(i,j) (8)

may be a pixel value of a pixel (i, j) in the mask image where $1 \leq i \leq n$ and $1 \leq j \leq m$.

The information concerning the acquisition condition includes information on an exposure period and gain. The information concerning the acquisition condition need not necessarily be included in the mask data. Note that, in the example of FIG. 7, information on a mask image and a background image is recorded for each of unit bands each having a width of 1 nm. The width of each unit band is not limited to 1 nm and can be any value. In a case where uniformity of background images is high, the mask data need not necessarily include information on the background image. For example, in a configuration in which the image sensor 120 and the filter array 110 are integrated so as to face each other in proximity to each other, the mask information almost matches the mask image, and therefore the mask image need not necessarily include information on the background image.

The mask data is, for example, data that defines the matrix H in the above formula (2). A format of the mask data can vary depending on a configuration of the system. The mask data illustrated in FIG. 7 includes information for calculating a spatial distribution of spectral transmittance of the filter array 110. The mask data is not limited to such a format and may be data that directly indicates a spatial distribution of spectral transmittance of the filter array 110. For example, the mask data may include a column of values obtained by dividing pixel values of the mask image illustrated in FIG. 7 by corresponding pixel values of the background image.

In the present embodiment, the first mask data including information such as the one illustrated in FIG. 7 is converted into second mask data of a smaller size. The following describes an example of a method for converting mask data in more detail.

A computation amount can be reduced by deciding a wavelength region considered to be small in contribution in analysis or classification on the basis of the acquired reference spectrum data and performing reconstruction computation after synthesizing bands whose degree of contribution is small. The bands to be synthesized may be decided by user's manual input or may be automatically decided on the basis of the reference spectrum data.

In a case where the bands to be synthesized are decided manually, the input UI 400 has a function of allowing a user to select the bands to be synthesized. The input UI 400 may have a function of allowing a user to select not only the bands to be synthesized, but also a reconstruction condition such as a wavelength region on which reconstruction computation is to be performed or wavelength resolution. For example, a list of spectra corresponding to individual substances (fluorescent substances or the like) that can be contained in a subject or kinds of the individual substances can be displayed on the display 330. The user can select a combination of specific spectra from among the displayed spectra or can select a combination of specific substances from the list. Furthermore, the user can select bands to be synthesized on the basis of a spectrum of a selected substance on the UI. In this way, a UI that allows a user to select reference spectrum data and a reconstruction condition of reconstruction computation may be displayed on the display. This makes it possible to more efficiently generate an image of a wavelength band necessary for a user.

In a case where the bands to be synthesized are automatically selected, a degree of contribution of each band to analysis or classification can be automatically estimated from a kind of selected substance or a combination of selected substances. For example, the signal processing circuit 250 may synthesize bands whose degree of contribution to analysis or classification is smaller than a threshold value into a single band. A degree of contribution can be, for example, determined on the basis of a signal intensity in a spectrum, a wavelength differential value of the signal intensity, pre-training, or the like. For example, in a case where it is known that a signal intensity of a spectrum of a substance contained in a subject in a certain band is smaller than a threshold value, it can be determined that contribution of the band to a result of analysis or classification is small. In a case where an absolute value of a wavelength differential value of a signal intensity is extremely small over successive bands, that is, in a case where signal intensities in the successive bands are almost same, loss of information resulting from synthesis of the bands does not occur. Therefore, such bands can be synthesized without affecting a result of analysis or classification. The pre-training is training based on a statistical method such as principal component analysis or regression analysis. One example of the pre-training is a method of deciding, as a "wavelength region whose degree of contribution is small", a wavelength region that is not a "wavelength region used for classification" on the basis of a reference spectrum by referring to a database in which a "wavelength region used for classification" is recorded for each substance.

Figure 8A:
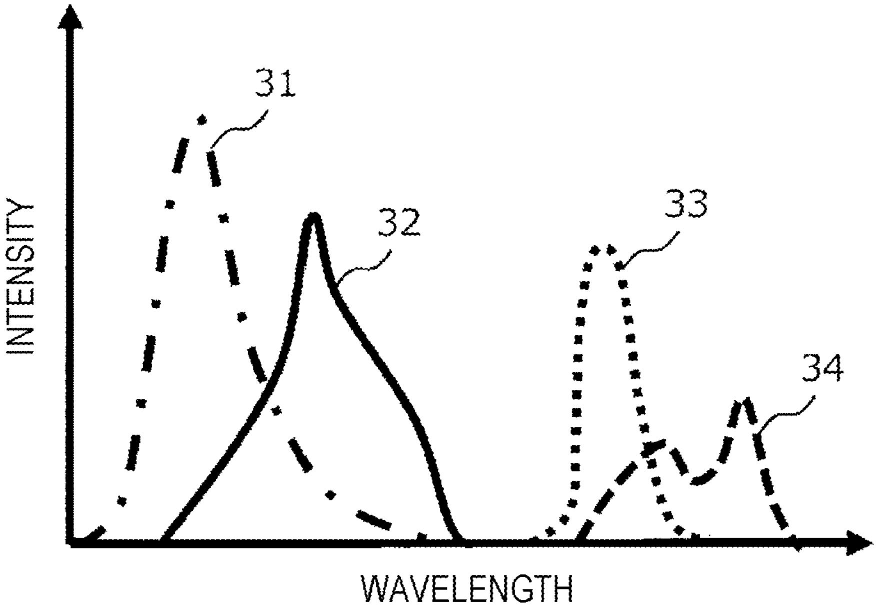
FIG. 8A illustrates an example of spectra of four kinds of samples that can be contained in a subject.
Figure 8B:
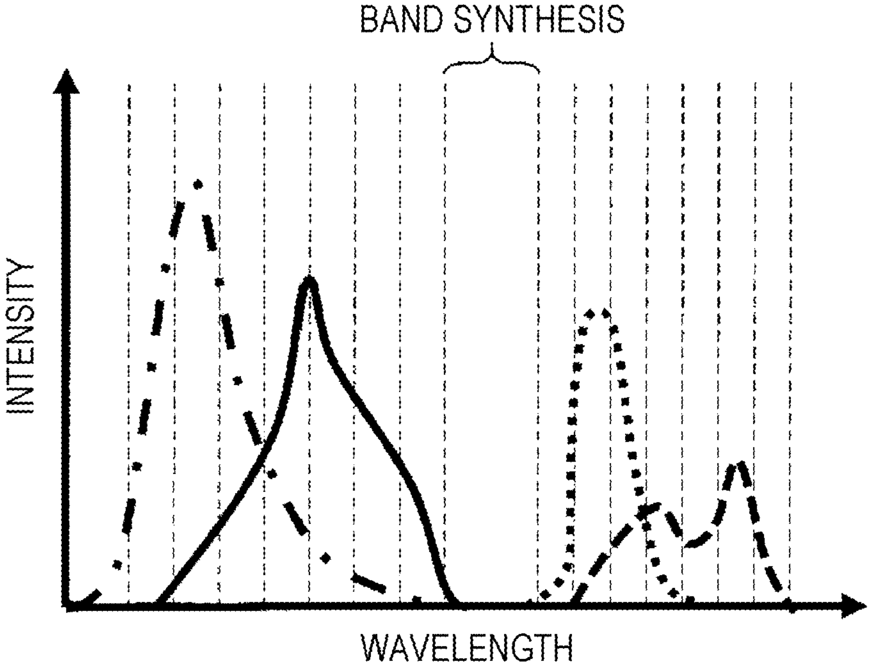
FIG. 8B illustrates an example of bands to be synthesized.

FIGS. 8A and 8B are views for explaining a method for estimating a band whose contribution to computation is small on the basis of a reference spectrum and deciding a band synthesis condition. FIG. 8A illustrates an example of spectra of four kinds of samples 31, 32, 33, and 34 that can be contained in a subject. FIG. 8B illustrates an example of bands to be synthesized. In a case where reference spectrum data such as the one illustrated in FIG. 8A is given, bands in which signal intensities of all reference spectra are small can be synthesized as illustrated in FIG. 8B. By such processing, a reconstructed image can be acquired at sufficient wavelength resolution as for a band in which a signal intensity is relatively high in a reference spectrum, and a computation amount can be reduced without affecting accuracy of analysis or classification. In this example, a wavelength band whose degree of contribution to analysis or classification is large is selected as a "designated wavelength band". Furthermore, a wavelength band whose degree of contribution to analysis or classification is small is selected as a "non-designated wavelength band".

Figure 9:
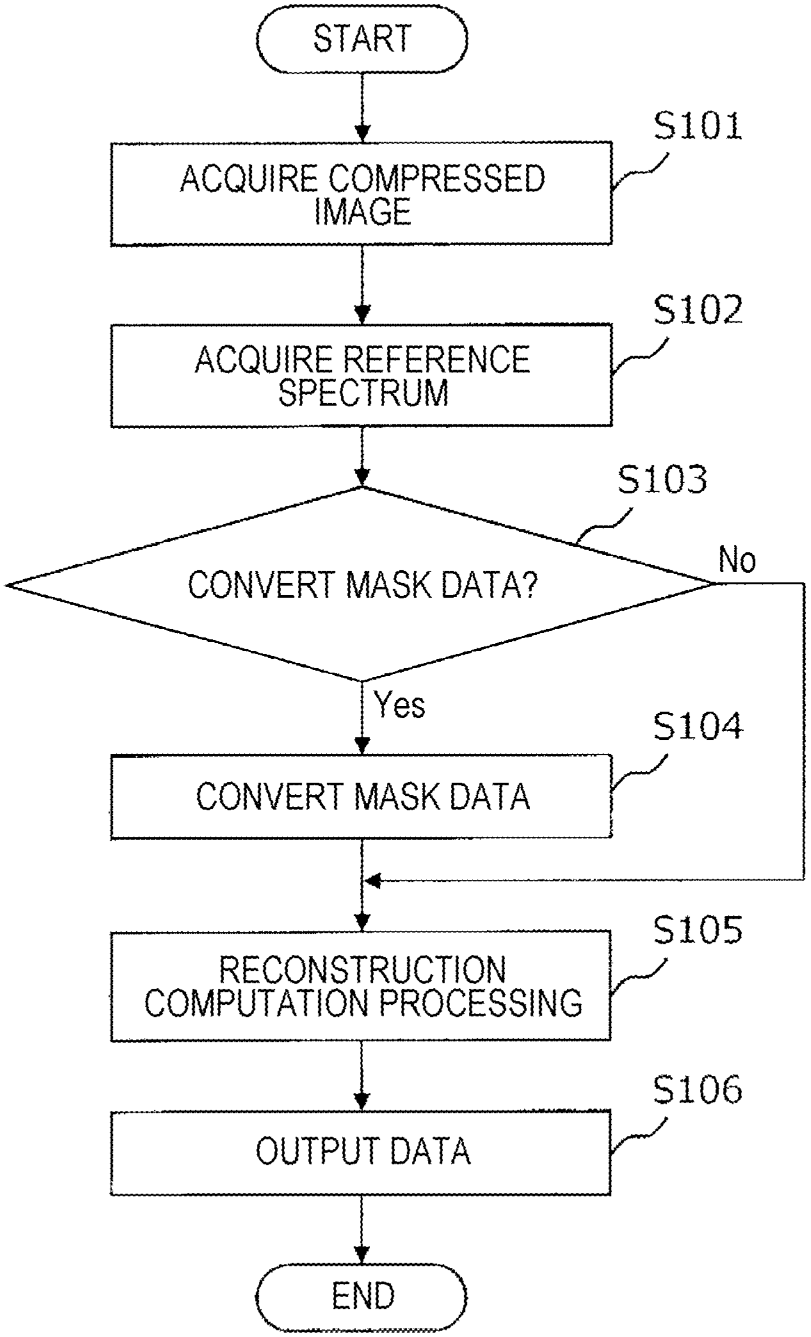
FIG. 9 is a flowchart illustrating an example of mask data conversion processing.

FIG. 9 is a flowchart illustrating an example of mask data conversion processing performed by the signal processing circuit 250 illustrated in FIG. 5. In step 5101, the signal processing circuit 250 acquires compressed image data generated by the imaging device 100. In step 5102, the signal processing circuit 250 acquires reference spectrum data from the input UI 400. In step S103, the signal processing circuit 250 determines whether or not to perform mask data conversion processing on the basis of the reference spectrum data. In a case where it is determined that it is necessary to perform mask data conversion processing, the signal processing circuit 250 converts mask data on the basis of the reference spectrum data. Whether or not to perform mask data conversion processing can be determined on the basis of whether or not there is a band that is estimated to be small in degree of contribution to analysis or classification, as described above. Alternatively, in a case where a user decides bands to be synthesized, the signal processing circuit 250 determines necessity of mask data conversion processing on the basis of a user's input. In a case where there are bands to be synthesized, step S104 is performed, in which the signal processing circuit 250 performs conversion processing. In a case where there is no band to be synthesized, the conversion processing is omitted. In next step S105, the signal processing circuit 250 performs reconstruction computation indicated by the above formula (2) on the basis of a compressed image and mask data and generates a reconstructed image for each band. In a case where mask data conversion is performed in step S104, the signal processing circuit 250 performs reconstruction processing by using the mask data after the conversion. The reconstructed image is sent to the display device 300 and is displayed on the display 330 after necessary processing is performed by the image processing circuit 320. Note that the acquisition of a compressed image in step S101 may be performed at any timing before step S105.

Figure 10:
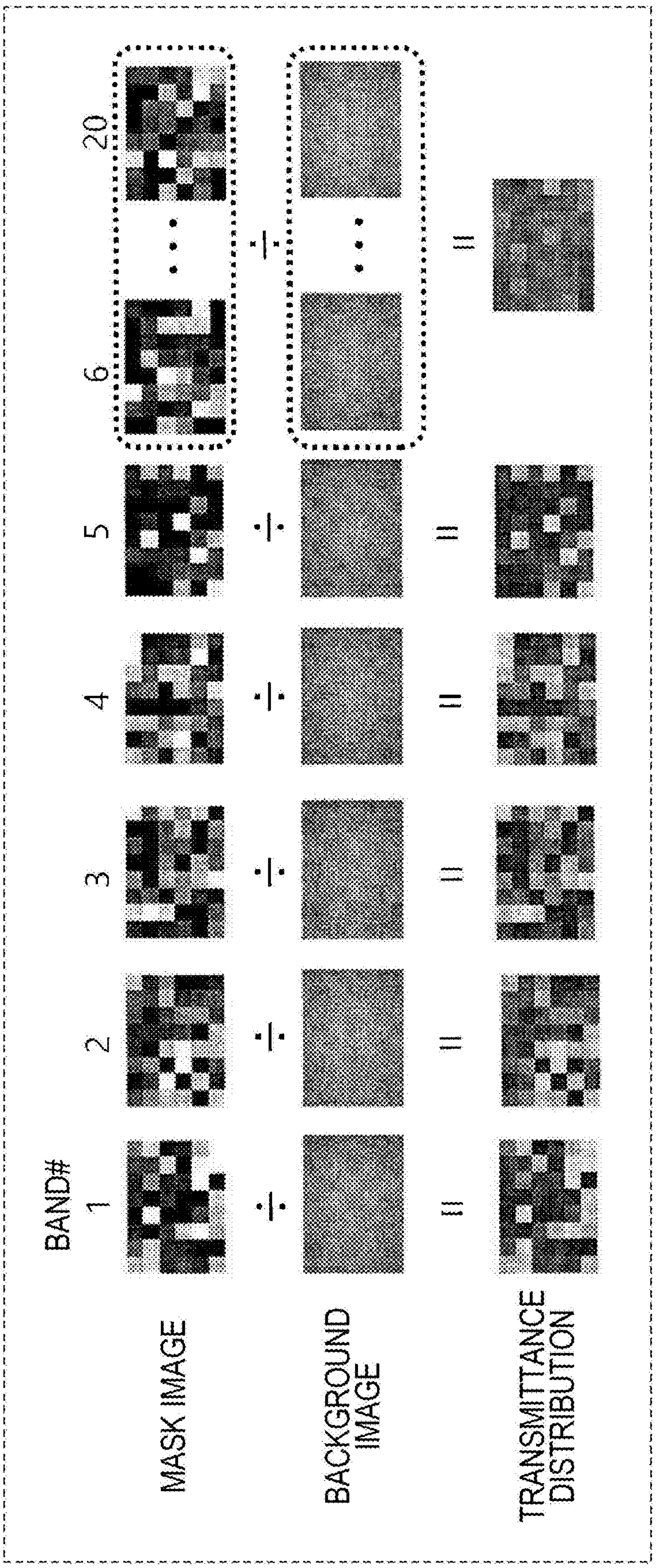
FIG. 10 is a view for explaining an example of a method for synthesizing mask information of bands into new mask information.

FIG. 10 is a view for explaining an example of a method for synthesizing mask information of bands into new mask information. In this example, mask information of unit bands #1 to 20 is stored in advance as mask information before conversion in the memory 210. In the example of FIG. 10, the unit bands #1 to 5 are not synthesized, and the unit bands #6 to 20 are synthesized. As for the unit bands #1 to 5, a transmittance distribution of the filter array 110 is calculated by dividing a value of each region in a mask image by a value of a corresponding region in a background image. Here, data of each mask image stored in the memory 210 is referred to as "unit mask image data", and data of each background image stored in the memory 210 is referred to as "unit background image data". As for the bands #6 to 20, a synthesized transmittance distribution is acquired by dividing data summing up, for each pixel, unit mask image data of the bands #6 to 20 by data summing up, for each pixel, unit background image data of the bands #6 to 20. A matrix H' corresponding to the matrix H indicated by the formula (1) in this example is H'=(F1F2 . . . F20), and each of F1, F2, . . . , and F20 is a submatrix of the matrix H' and may be a diagonal matrix of n×m rows and n×m columns. By performing such an operation, mask information can be synthesized for any bands. In a case where uniformity of background images is very high, mask information almost matches a mask image. In this case, data obtained summing up the mask image data of the bands #6 to 20 or data obtained by averaging the mask image data of the bands #6 to 20 may be used as synthesized mask data of the bands #6 to 20. In this case, the matrix H' is changed to a matrix H". The matrix H" is H"=(F1F2 . . . F5F'), and $$Fi = \begin{pmatrix} hi(1,1) & \dots & 0 \\ \vdots & \ddots & \vdots \\ 0 & \dots & hi(n\times m, n\times m) \end{pmatrix} \quad (9)$$

$$F' = \begin{pmatrix} h'(1,1) & \dots & 0 \\ \vdots & \ddots & \vdots \\ 0 & \dots & h'(n\times m, n\times m) \end{pmatrix}$$

where i=1, . . . , 20.

The following may be satisfied:

$$h'(1,1)=(h6(1,1)+ \dots +h20(1,1))/15, \dots ,h'(n\times m, n\times m)=(h6(n\times m, n\times m)+ \dots +h20(n\times m, n\times m))/15.$$

By performing the above band synthesizing processing, in a case where the bands #6 to 20 are synthesized, only computation for six bands is needed although computation for 20 bands is needed in a case where reconstruction is performed for all unit bands. Even in a case where such synthesis is performed, images of bands can be generated while maintaining wavelength resolution in the wavelength region of the bands #1 to 5. This can reduce a computation amount.

Note that the mask data conversion processing using synthesis may be performed in an environment in which the system or apparatus is used by an end user or may be performed in a site of production such as a factory in which the system or apparatus is produced. In a case where the mask data conversion processing is performed in a site of production, second mask data after conversion is stored in the memory 210 in a production process instead of or in addition to the first mask data before conversion. In this case, when used by an end user, the signal processing circuit 250 can perform reconstruction processing by using the mask data after conversion stored in advance in response to a user's input. This can further lessen a load of processing.

Embodiment 2

Next, a second embodiment is described. In Embodiment 1, a computation amount of reconstruction processing is reduced by synthesizing unit bands whose degree of contribution to analysis or classification is low into a single band. On the other hand, in the present embodiment, a signal processing circuit 250 performs band synthesis so that an image after reconstruction becomes a classification image as it is in a case where overlapping between reference spectra is considered to be small. This can further lessen a load of signal processing.

Figure 11A:
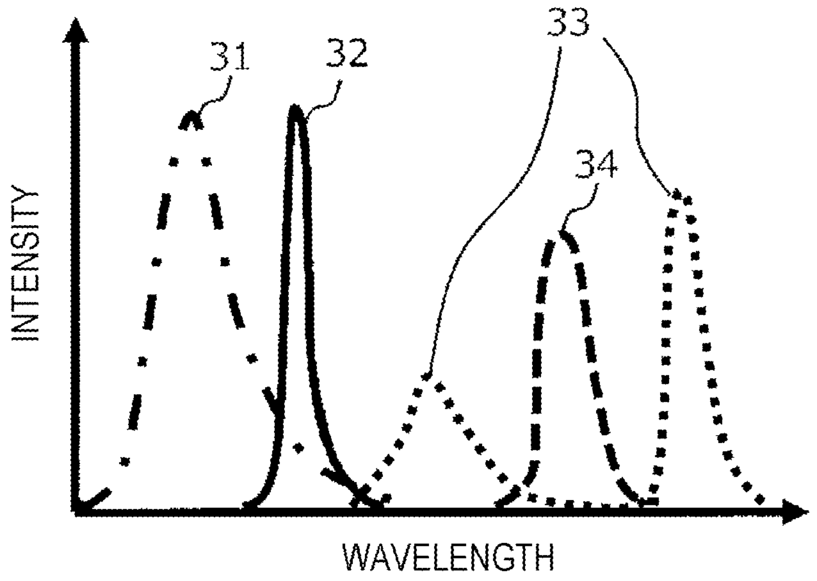
FIG. 11A illustrates an example of reference spectra of four kinds of samples that can be contained in a subject.
Figure 11B:
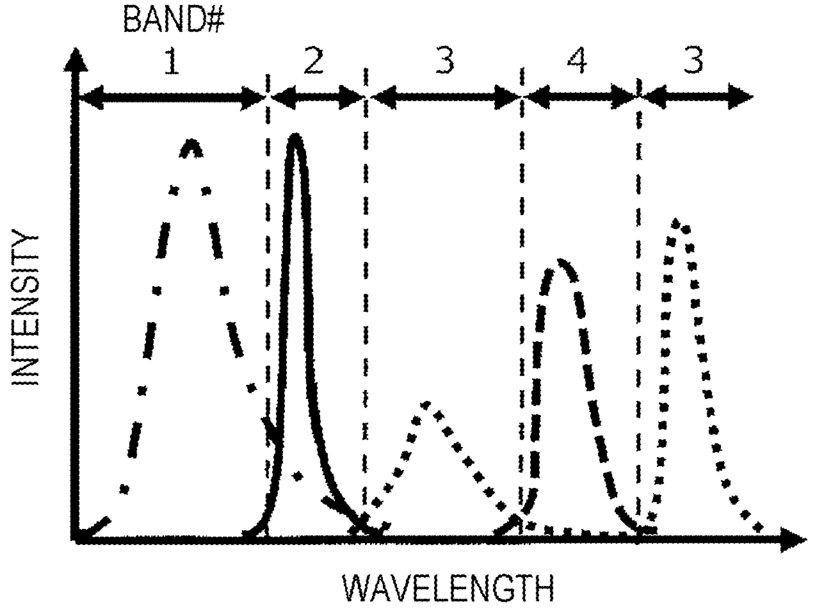
FIG. 11B illustrates an example of band synthesis.

FIGS. 11A and 11B are views for explaining band synthesizing processing in the present embodiment. FIG. 11A illustrates an example of reference spectra of four kinds of samples 31, 32, 33, and 34 that can be contained in a subject. FIG. 11B illustrates an example of band synthesis. In a case where overlapping between reference spectra is small as illustrated in FIG. 11A, it is effective to perform band synthesis in accordance with peaks of spectra. This can create a situation where a substance corresponding to almost one kind of spectrum is shown in each reconstructed image. In a case where band synthesis is performed as illustrated in FIG. 11B, the sample 31 substantially has a signal intensity in an image corresponding to a band #1. Therefore, a reconstructed image corresponding to the band #1 can be handled as a classification image of the sample 31. Similarly, a reconstructed image of a band #2 can be handled as a classification image of the sample 32, a reconstructed image of a band #3 can be handled as a classification image of the sample 33, and a reconstructed image of a band #4 can be handled as a classification image of the sample 34. This makes it possible to perform classification processing together with reconstruction processing although classification processing needs to be performed after reconstruction processing in a case where such band synthesis is not performed. This can markedly lessen a load of signal processing.

How much reference spectra overlap each other can be determined, for example, by the following method. For example, a wavelength region of wavelengths λ1 to λ2 is discussed. In a case where values of each reference spectrum are integrated from λ1 to 2, an integral value of a reference spectrum having a largest integral value is regarded as a signal S, and a sum of integral values of the other reference spectra is regarded as noise N. How much reference spectra overlap each other can be determined on the basis of a value of a signal-noise ratio (S/N ratio) obtained by dividing the signal S by the noise N. For example, in a case where the S/N ratio is lower than 1, it is determined that overlapping is large, and it can be determined that reference spectra overlap each other. On the contrary, in a case where the S/N ratio is equal to or larger than 1, it is determined that overlapping is small, and it can be determined that reference spectra do not overlap each other. Alternatively, it may be determined that reference spectra do not overlap each other in a case where the S/N ratio is equal to or larger than 2, and it may be determined that reference spectra overlap each other in a case where the S/N ratio is less than 2.

The signal processing circuit 250 in this example decides designated wavelength bands so that the designated wavelength bands do not have overlapping between reference spectra, and synthesizes unit bands included in each of the designated wavelength bands into a single band. Each of the designated wavelength bands in this example includes a peak wavelength of a spectrum associated with a corresponding one of substances.

Alternatively, the reference spectra may be displayed on an input UI 400, and a user himself or herself may decide a range of bands to be synthesized by an operation such as moving a band end. By displaying the S/N ratio on a screen, user's judgement may be assisted.

The signal processing circuit 250 in this example generates compressed second mask data by processing such as averaging elements corresponding to each designated wavelength band in first mask data. The signal processing circuit 250 generates image data corresponding to each designated wavelength band by performing computation corresponding to the above formula (2) on the basis of compressed image data and the second mask data. By using the compressed second mask data, a load of reconstruction computation can be markedly reduced.

An example of a case where overlapping between reference spectra is small is a relationship between a spectrum of excitation light and a spectrum of fluorescence in the case of fluorescence observation. According to the present embodiment, images after reconstruction can be observed as an image of excitation light and an image of fluorescence as they are.

In a case where overlapping between reference spectra is considered to be small, contents input on the input UI 400 can be used for labeling of a reconstructed image. The “labeling” as used herein refers to associating a known substance name or a sign for classification with a certain region of a reconstructed image or with a reconstructed image corresponding to a band in which a signal intensity is unbalancedly high in a certain region.

Figure 12:
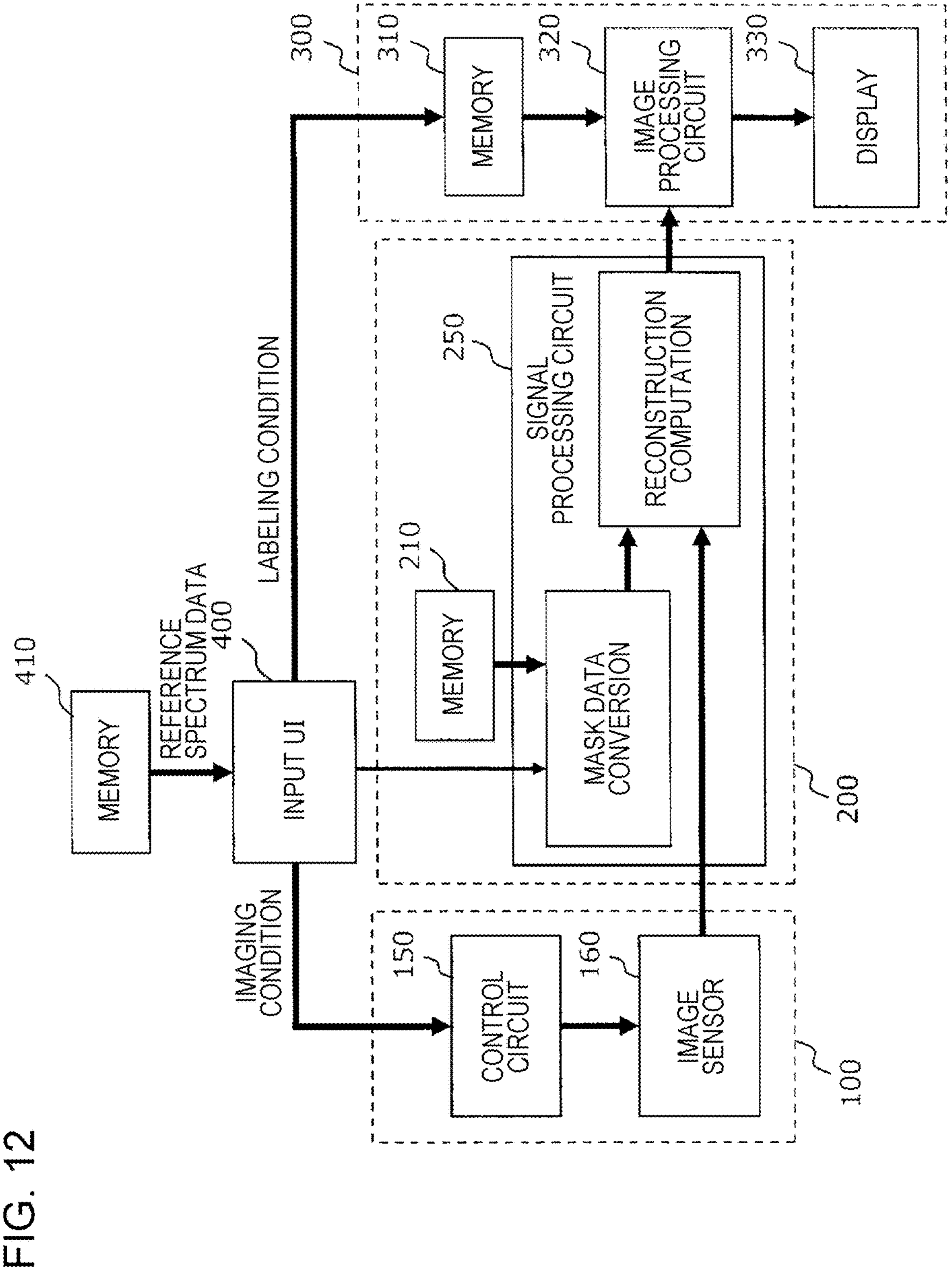
FIG. 12 is a block diagram illustrating a configuration example of a system that performs labeling.

FIG. 12 is a block diagram illustrating a configuration example of a system employed in a case where labeling is performed. In the example of FIG. 12, the input UI 400 decides a labeling condition corresponding to a substance or a spectrum selected by a user and sends the information to a memory 310 of a display device 300. An image processing circuit 320 of the display device 300 performs labeling processing on each reconstructed image as needed in accordance with the sent labeling condition and caused the labeled reconstructed image to be displayed on the display 330.

There can be various forms and methods of labeling. An example of labeling processing is described below by taking an example of a relationship between a spectrum of excitation light and a spectrum of fluorescence in the case of fluorescent observation. Assume that band synthesis is performed so that a reconstructed image of a certain band X becomes an image of excitation light and a reconstructed image of another band Y becomes an image of fluorescence. In this case, the input UI 400 can specify that the band X corresponds to excitation light and the band Y corresponds to a specific fluorescent substance on the basis of a band synthesis condition decided on the basis of reference spectrum data. The input UI 400 can decide, for example, a labeling condition for allocating a name of the fluorescent substance or a sign for classification to the reconstructed image of the band Y or a specific region of the reconstructed image. A name such as “excitation light band” or a classification sign may be allocated to a band determined as a wavelength region of excitation light. As for contents of labeling, information such as a name input on the input UI 400 by a user may be used for labeling. Labeling may be automatically performed on the basis of known physical property information.

Figure 13A:
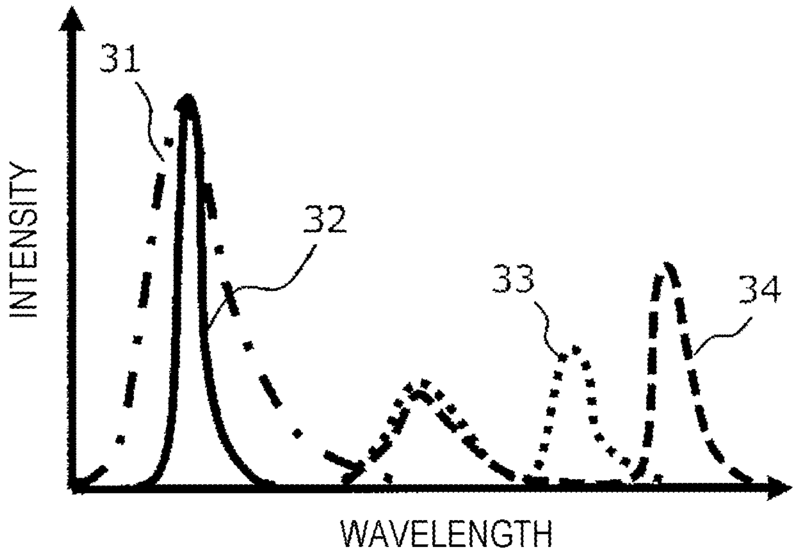
FIG. 13A illustrates an example of reference spectra of four kinds of samples that can be contained in a subject.
Figure 13B:
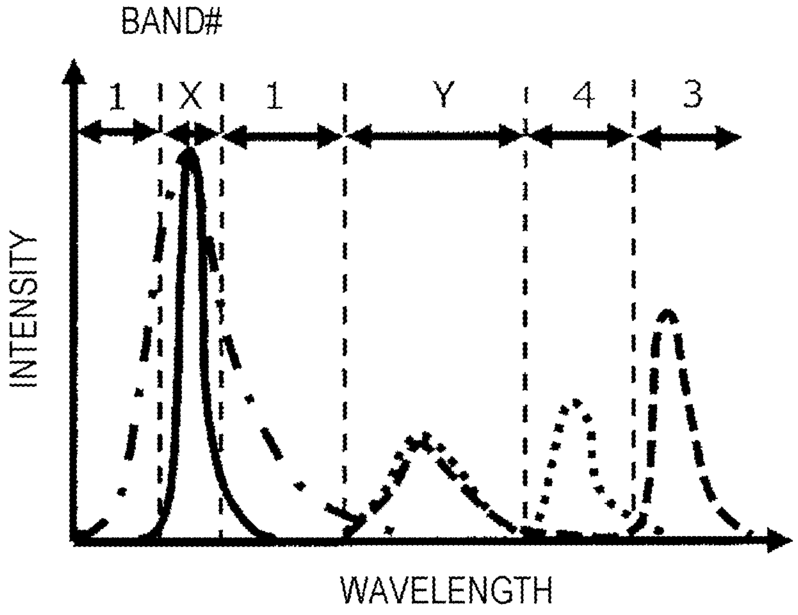
FIG. 13B illustrates an example of band synthesis.

FIGS. 13A and 13B illustrate an example of reference spectra of four samples 31 to 34 that overlap each other much. In a case where overlapping between reference spectra is large as in this example, it is impossible to perform band synthesis such that a reconstructed image and a classification image match each other. However, by performing band synthesis as illustrated in FIG. 13B, overlapping can be made small as for a certain spectrum. As for a band and a sample having no overlapping or small overlapping between spectra, classification can also be performed at a time of reconstruction. As for a band and a sample having large overlapping, a substance assumed to be contained in the band can be narrowed down. Observer's understanding can be assisted by displaying a substance that can be contained in the band as needed.

As described above, designated wavelength bands may include one or more first designated wavelength bands that do not have overlapping between spectra and one or more second designated wavelength bands that have overlapping between spectra. In the example of FIG. 13B, a band #1, a band #3, and a band #4 correspond to the first designated wavelength bands, and a band #X and a band #Y correspond to the second designated wavelength bands. As for the first designated wavelength bands, classification can be performed concurrently with reconstruction. As for the second designated wavelength bands, a small number of substances assumed to be contained in the band can be narrowed down concurrently with reconstruction.

Figure 14:
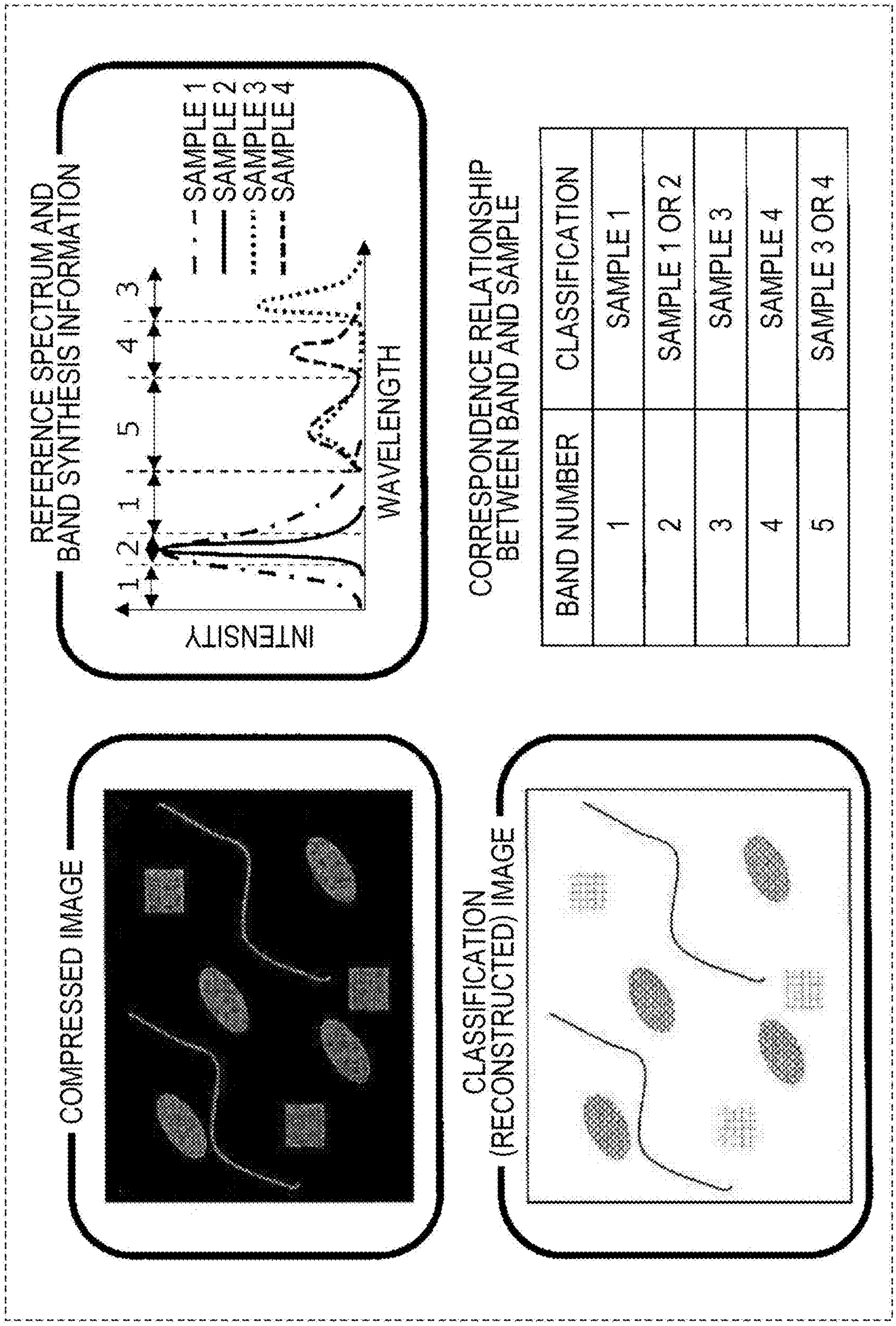
FIG. 14 illustrates an example of a graphical user interface (GUI)

FIG. 14 illustrates an example of a graphical user interface (GUI) that enables an operation performed in the present embodiment. This GUI displays a compressed image, a reconstructed image, a reference spectrum and band synthesis information, and a table showing a correspondence relationship between a band and a sample (i.e., a substance). Display concerning reconstruction of a hyperspectral image and/or display concerning analysis of a hyperspectral image, and/or display of a reconstructed hyperspectral image may be added or deleted as needed. As described above, in a case where overlapping between reference spectra is small, it is possible to perform band synthesis such that band numbers and classifications correspond on a one-to-one basis. As for the display part of “reference spectrum and band synthesis information”, a result of band synthesis such as the one illustrated in FIG. 10 or a result of band synthesis in which a certain band is excluded from a reconstruction target such as the one illustrated in FIG. 15B, which will be described later, may also be displayed.

Embodiment 3

Next, a third embodiment of the present disclosure is described. In the present embodiment, a load of reconstruction computation is further reduced by excluding, from a reconstruction target, a band considered to have low importance among bands included in a target wavelength region.

Generally, reconstruction computation is performed by using information of all bands included in a target wavelength region. In a case where even any one of the bands included in the target wavelength region is not used in reconstruction computation, the relationship g=Hf in the above formula (1) is not satisfied. In this case, an optical signal of a wavelength belonging to the excluded band is allocated as noise to other bands and becomes a reconstruction error that decreases accuracy of subsequent analysis or classification. However, in a case where a spectrum of an observation target is known as in fluorescent observation, a band predicted to have zero signal intensity or an extremely small signal intensity can occur within the target wavelength region depending on a combination of observation targets. In a case where a signal intensity of a certain band included in the target wavelength region is zero or extremely small, a reconstruction error caused by excluding the band from a target of reconstruction computation is zero or extremely small. Even in a case where such a band is excluded, subsequent analysis or classification is not substantially affected. Therefore, in a case where a signal intensity emitted from an observation target in a certain band included in the target wavelength region is predicted to be zero or extremely small, the band can be excluded from the reconstruction computation. This can also be explained as follows. A formula satisfied in a case where reconstruction is performed for all bands included in a target wavelength region is g=Hf, as described above. Assume that a formula satisfied in a case where a certain band is excluded is g'=HT. Assume that H'=H−ΔH and f=f−Δf. ΔH and Δf represent elements corresponding to the excluded band. Since Δf is 0 or extremely small, g'=H'f=H'f is approximately established. Therefore, reconstruction computation expressed by g'=H'f, that is, reconstruction computation excluding the certain band is established.

Figure 15A:
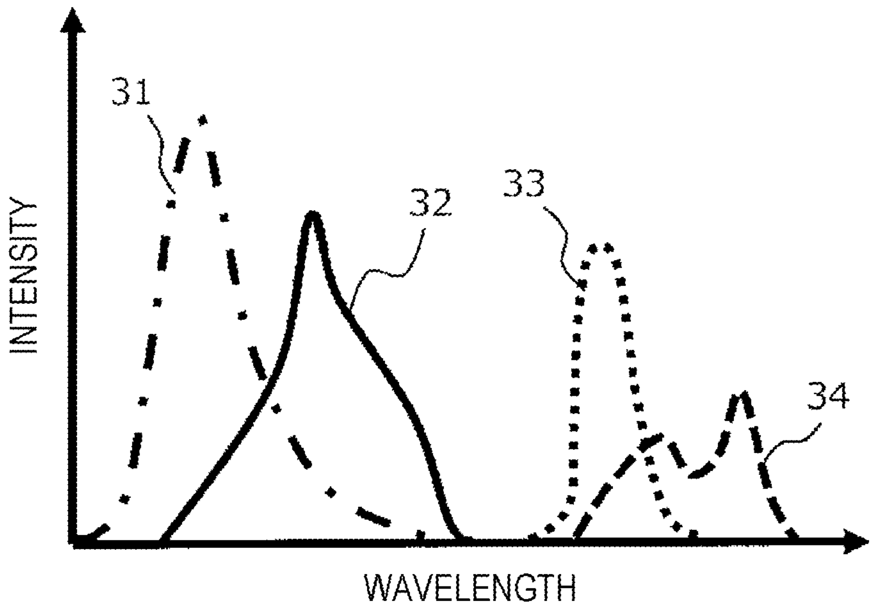
FIG. 15A is a first view for explaining a method for excluding a specific band from a reconstruction target.
Figure 15B:
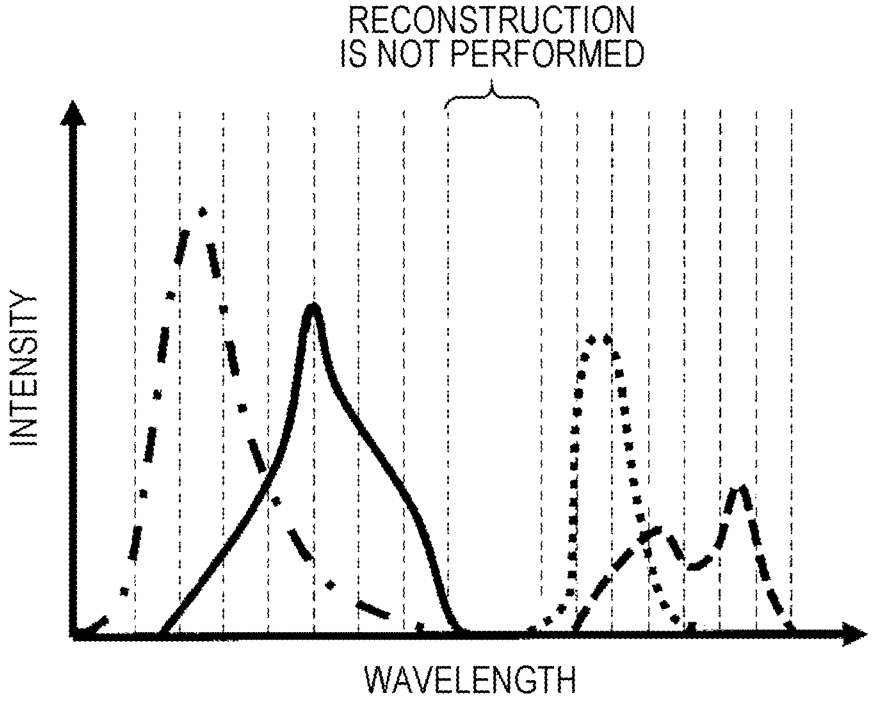
FIG. 15B is a second view for explaining a method for excluding a specific band from a reconstruction target.

FIGS. 15A and 15B are views for explaining a method for excluding a specific band from a reconstruction target on the basis of reference spectrum data. In a case where four samples 31, 32, 33, and 34 having spectra such as the ones illustrated in FIG. 15A are considered to be present in an imaging region, a band in which it is predicted that all samples have no signal intensity, that is, a pitch-black image is output is present at a wavelength between the sample 32 and the sample 33. Such a band predicted to have no signal intensity can be excluded from a reconstruction target as illustrated in FIG. 15B. By decreasing the number of bands for which reconstruction is performed, a load of signal processing can be reduced.

Figure 16:
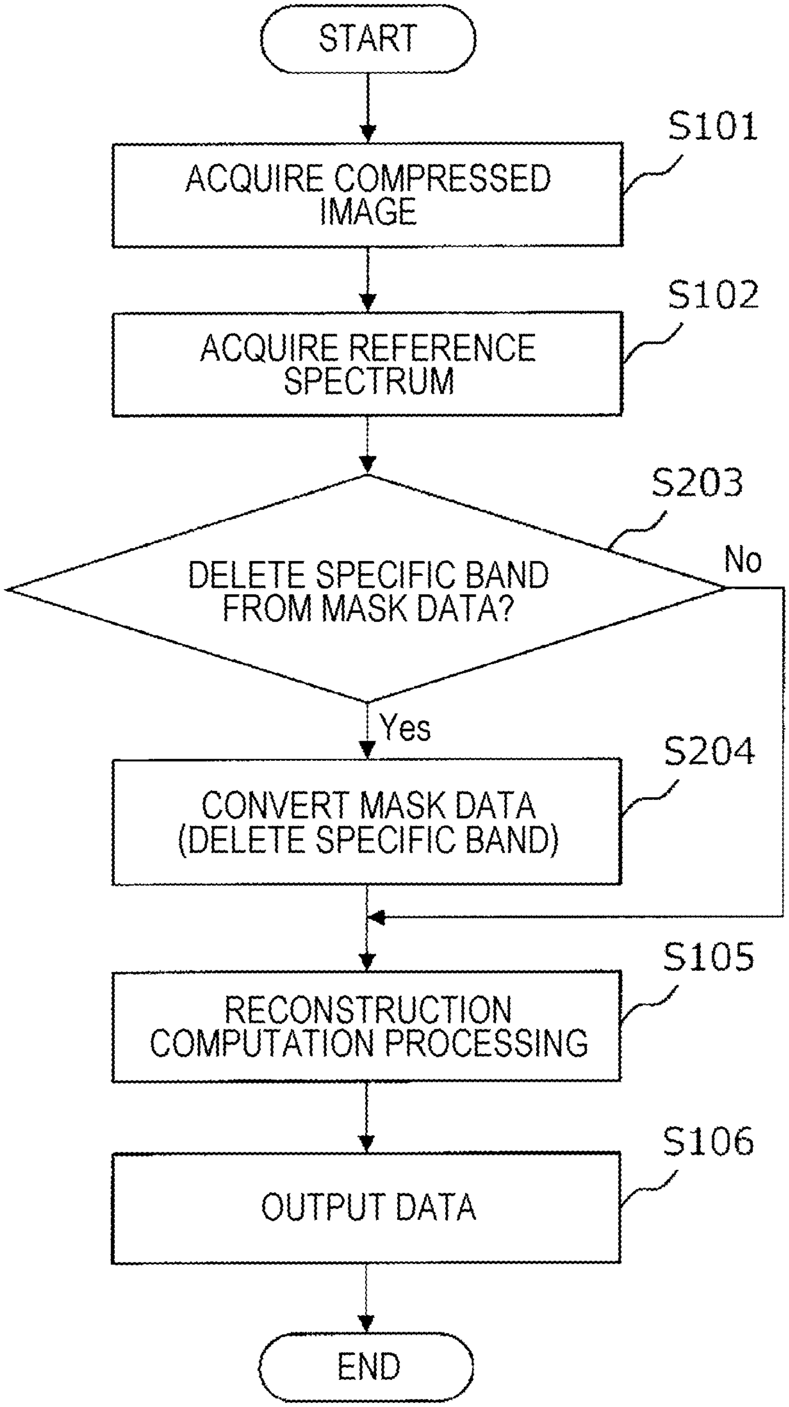
FIG. 16 is a flowchart illustrating an example of operation of a signal processing circuit in a case where a specific band is excluded from reconstruction.

FIG. 16 is a flowchart illustrating an example of operation of the signal processing circuit 250 in a case where a specific band is excluded from reconstruction. The flowchart illustrated in FIG. 16 is one obtained by replacing the processing (step S103 and S104) of synthesizing specific bands in the flowchart illustrated in FIG. 9 with processing (steps S203 and S204) of deleting information of a specific band. In step S203, a signal processing circuit 250 determines whether or not to delete information of a specific band from mask data. In a case where there is a band for which it is predicted that an image having no signal intensity for all assumed samples is output on the basis of reference spectrum data, the signal processing circuit 250 proceeds to step S204, in which information of the band is deleted from the mask data. In a case where there is no band for which it is predicted that an image having no signal intensity is output, step S204 is omitted. By such an operation, a computation amount of reconstruction computation processing in subsequent step S105 can be reduced, and a computation period can be shortened.

Figure 17:
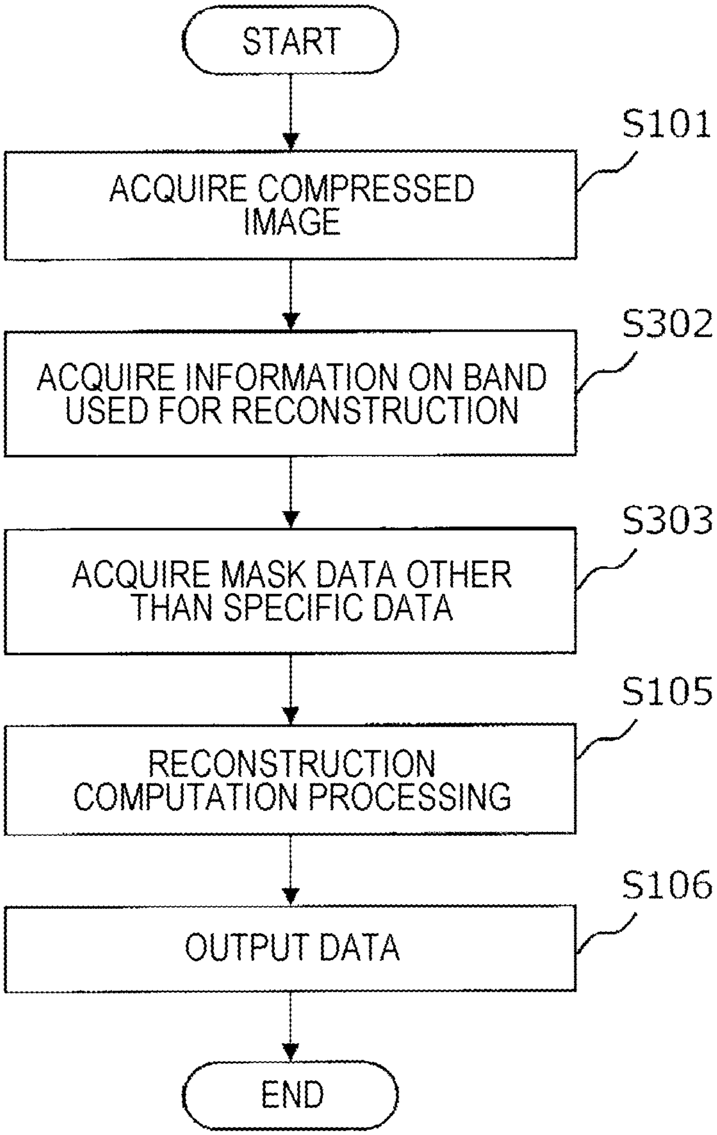
FIG. 17 is a flowchart illustrating an example of operation in a case where reference spectrum data is translated into a mask data conversion condition and is sent to a signal processing circuit.

FIG. 17 is a flowchart illustrating an example of operation performed in a case where reference spectrum data is translated into a mask data conversion condition and is then sent to the signal processing circuit 250 as in the example illustrated in FIG. 6. This flowchart is one obtained by replacing steps S102, S103, and S104 in the flowchart of FIG. 9 with steps S302 and S303. In the example of FIG. 17, the signal processing circuit 250 acquires information on a mask data conversion condition, that is, a band used for reconstruction from a processor 420 illustrated in FIG. 6 in step S302. A specific band that is not used for reconstruction can be decided on the basis of the information. In next step S303, the signal processing circuit 250 acquires mask data excluding the specific band from a memory 210. That is, mask data of the specific band to be deleted is not read. Therefore, it is possible to decrease the number of processing steps as compared with the example of FIG. 16 in which mask data of the specific band is deleted after mask data of all bands is read once. In this case, reference spectrum data need not necessarily be stored in a memory 410. For example, a name of a material or a substance input or selected on an input UI 400 and a conversion condition may be associated. By such association, the processor 420 or the signal processing circuit 250 can decide a band to be excluded without referring to reference spectrum data. As another aspect, labeling information such as a substance name corresponding to each spectrum may be extracted from reference spectrum data stored in the memory 410, and labeling of each reconstructed image may be performed by using the labeling information.

Embodiment 4

Next, a fourth embodiment of the present disclosure is described. The present embodiment relates to a system for performing fluorescent observation.

Figure 18:
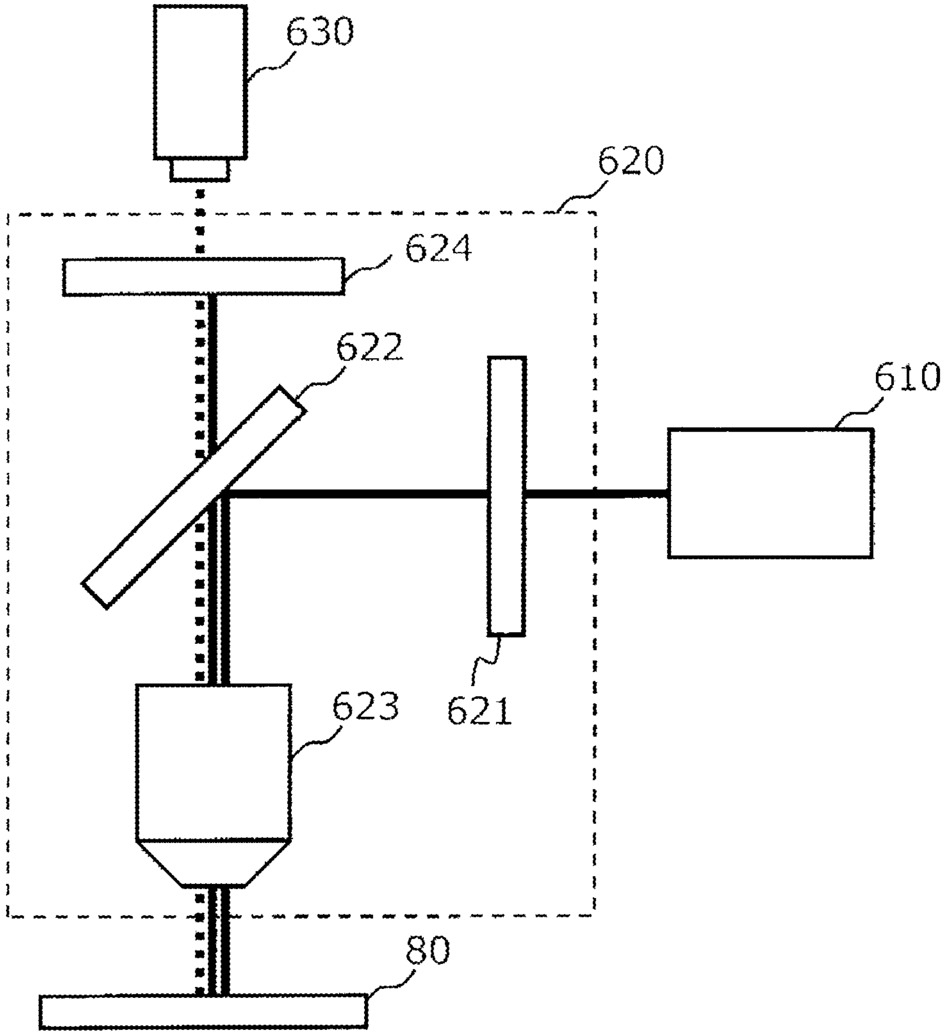
FIG. 18 schematically illustrates a configuration of a system according to Embodiment 4.

FIG. 18 schematically illustrates a configuration of a system according to the present embodiment. This system includes a light source 610, an optical system 620, and a detector 630. The optical system 620 includes an interference filter 621, a dichroic minor 622, an objective lens 623, and a long pass filter 624. The light source 610 can include a laser light-emitting element that emits excitation light. The detector 630 includes an imaging device 100 described above. A sample 80 containing a fluorescent material is irradiated with excitation light, and emitted fluorescence is detected by the detector 630.

Excitation light emitted from the light source 610 enters the dichroic mirror 622 after passing the interference filter 621 that selectively allows light of a specific wavelength that excites the fluorescent material to pass therethrough. The dichroic mirror 622 reflects light of a wavelength region including a wavelength of the excitation light and allows light of other wavelength regions to pass therethrough. The excitation light reflected by the dichroic minor 622 enters the sample 80 through the objective lens 623. The sample 80 that has received the excitation light emits fluorescence. The fluorescence is detected by the detector 630 after passing the dichroic minor 622 and the long pass filter 624. A part of the excitation light entering the sample 80 is reflected. Although a large part of the excitation light reflected by the sample 80 is reflected by the dichroic minor 622, a part of the excitation light travels toward the detector 630 after passing the dichroic mirror. Although the excitation light does not pass through the dichroic mirror 622 much, the excitation light typically has an intensity higher by several orders than fluorescence, and therefore when the excitation light enters the detector 630 together with fluorescence, observation of fluorescence may be hindered due to saturation of electric charges in the image sensor. To suppress occurrence of such a phenomenon, the long pass filter 624 is disposed before the detector 630, and thus the optical system 620 is constructed so that the excitation light does not enter the detector 630. Note that the long pass filter 624 is used because the excitation light has higher energy, that is, a shorter wavelength than fluorescence in fluorescent observation.

The detector 630 can be, for example, a hyperspectral camera including the imaging device 100 and the processing apparatus 200 according to Embodiment 2. The detector 630 performs reconstruction processing on the basis of mask data excluding information of an unnecessary band corresponding to the excitation light, as described above.

Figure 19:
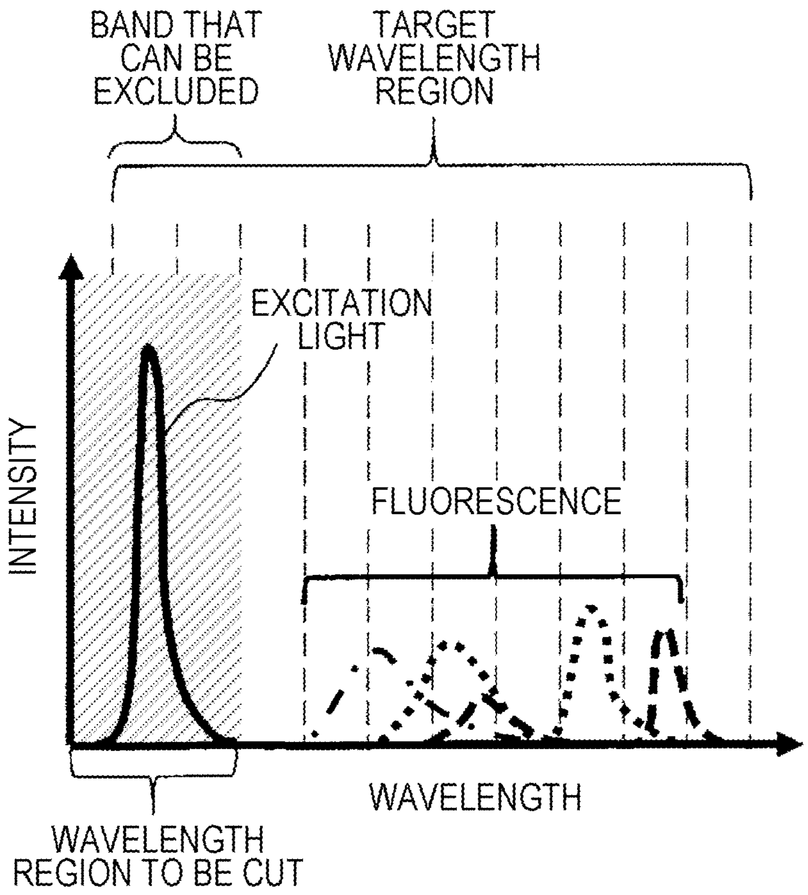
FIG. 19 illustrates an example of a relationship between spectra of excitation light and fluorescence and bands to be excluded.

FIG. 19 illustrates an example of a relationship between spectra of excitation light and fluorescence and a band to be excluded. In this example, the sample 80 contains kinds of fluorescent materials. Spectra of fluorescence emitted from these fluorescent materials are different from each other. Since energy of the excitation light is higher than energy of fluorescence, a wavelength of the excitation light is shorter than a wavelength of the fluorescence. In the example of FIG. 19, a wavelength region of light that actually enters the detector 630 is narrower than a target wavelength region that can be detected by the detector 630 due to characteristics of the dichroic mirror 622 and the long pass filter 624. In the present embodiment, the optical system 620 is constructed so that the dichroic mirror 622 and the long pass filter 624 do not allow light of a short wavelength to pass therethrough to cut the excitation light. In this case, it is known in advance that the wavelength region to be cut does not have a signal intensity even in a case where the target wavelength region of the detector 630 and the wavelength region to be cut overlap each other. That is, it is known in advance that the above formula $g'=H'f'=H'f$ is satisfied. Therefore, the band of this wavelength region can be excluded from reconstruction computation.

Characteristics of the long pass filter 624 and the dichroic mirror 622 are selected on the basis of a wavelength of fluorescence to be observed and a wavelength of excitation light used. Therefore, according to the configuration of the present embodiment in which any selected band can be excluded from reconstruction computation, observation can be performed by minimum arithmetic processing according to an observation target.

EXAMPLE

Example in which a method according to an embodiment of the present disclosure is applied to the m-FISH method, which is one method of fluorescent observation, is described.

The fluorescent in-situ hybridization (FISH) method is a method of labeling a probe having a gene sequence complementary with a specific sequence of a gene with a fluorescent pigment and specifying a place or a chromosome hybridized by fluorescence. In the multicolor FISH (m-FISH) method, probes labelled with different fluorescent pigments are concurrently used.

The m-FISH method is used for tests of some kinds of cancers such as leukemia and congenital genetic abnormalities. For example, a probe for m-FISH produced by Cambio uses five kinds of fluorescent pigments and is designed so that the five kinds of fluorescent pigments are attached to a human or mouse chromosome in an attachment ratio that varies depending on a number of the chromosome. Therefore, by dyeing a pair of chromosomes with this probe, a number of each chromosome can be specified.

In a case where there is no translocation that causes cancer and a congenital genetic abnormality, a whole of each chromosome exhibits a single fluorescence spectrum. However, in a case where there is translocation, a fluorescence spectrum varies from one part to another of a chromosome. By utilizing this property, translocation can be detected.

Figure 20A:
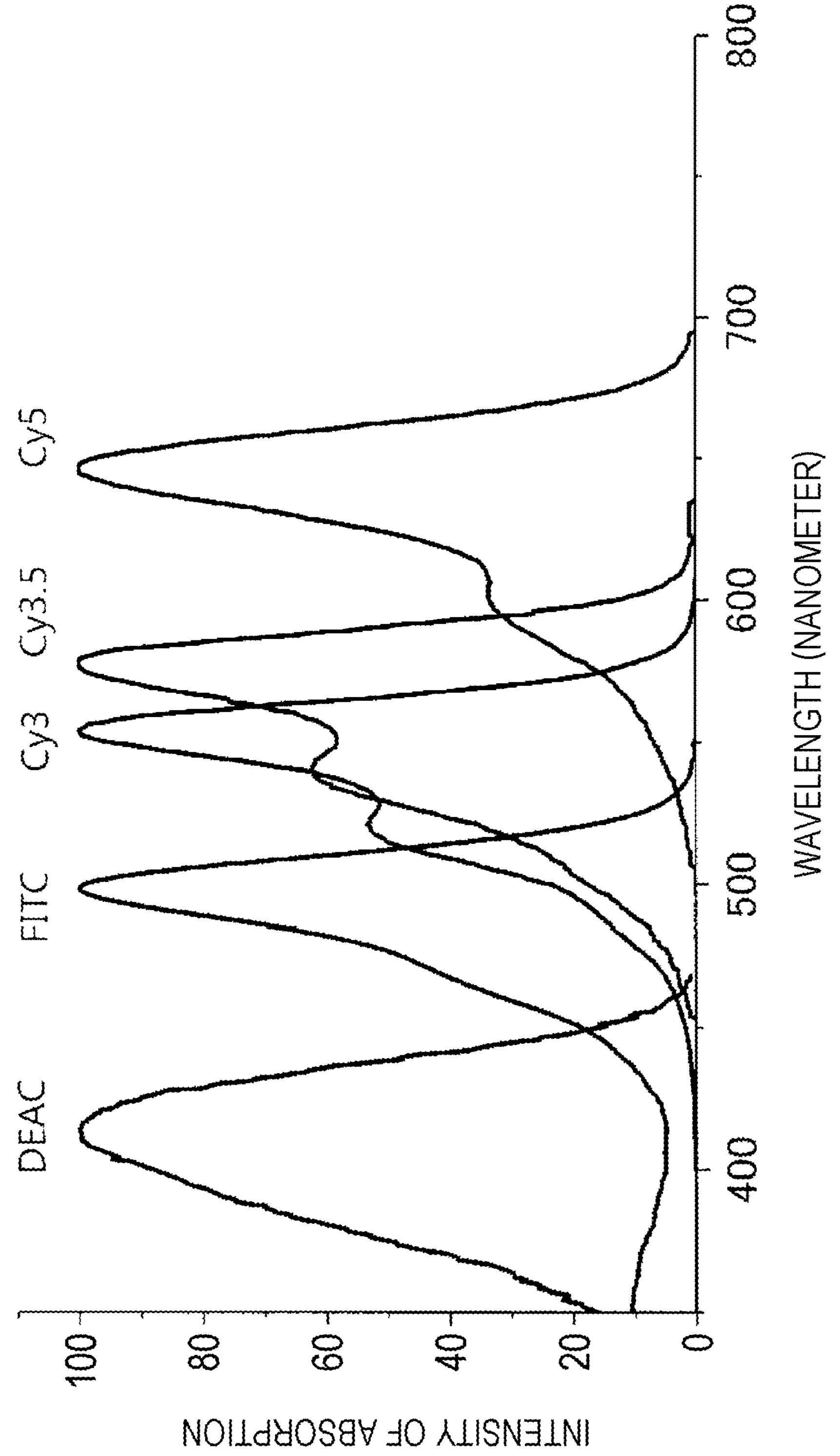
FIG. 20A illustrates absorption spectra of five kinds of fluorescent pigments.
Figure 20B:
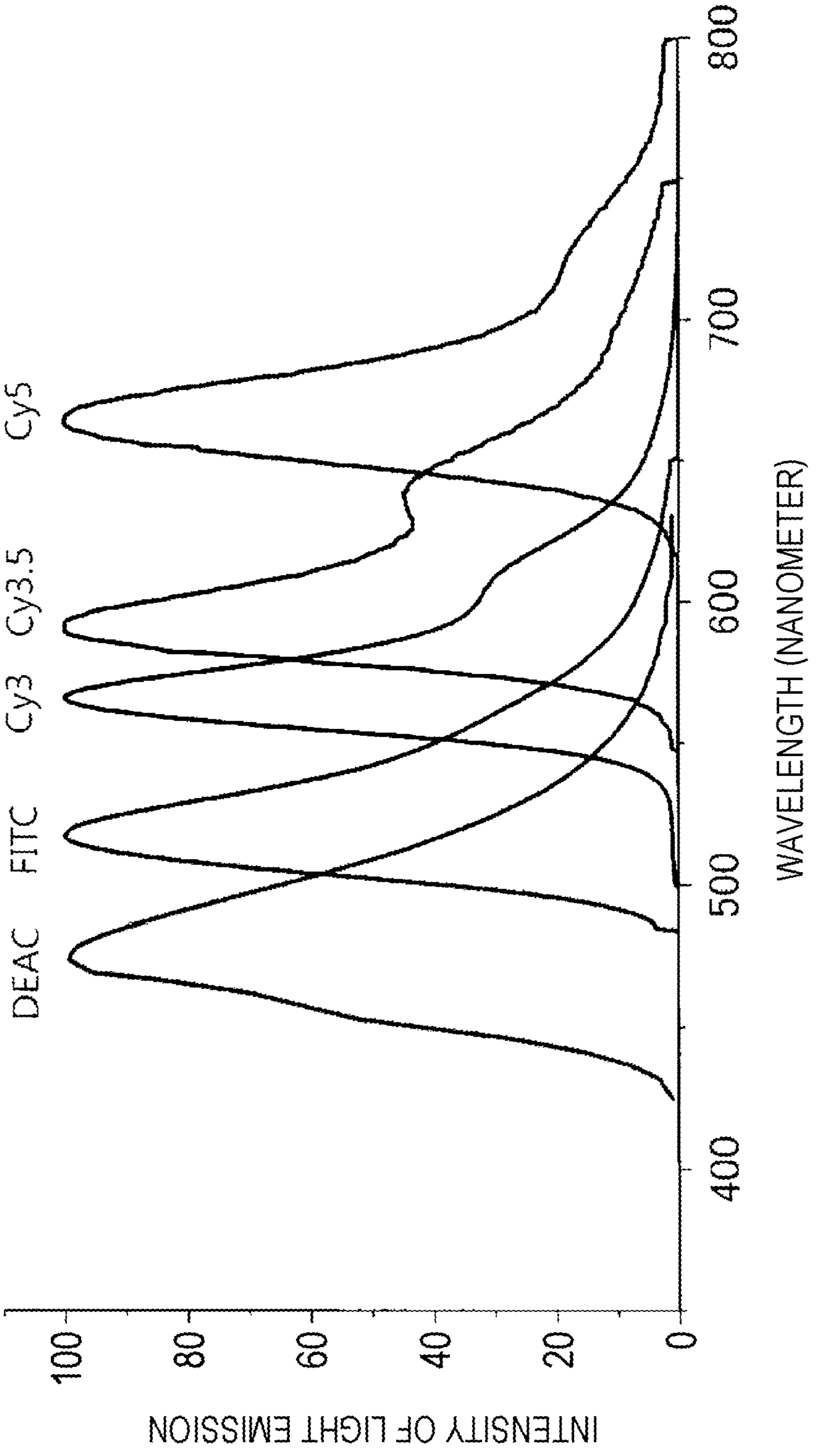
FIG. 20B illustrates fluorescence spectra of the five kinds of fluorescent pigments.

FIG. 20A illustrates absorption spectra of five kinds of fluorescent pigments (Cy3, Cy3.5, Cy5, FITC, and DEAC) used for fluorescence labeling for the m-FISH method produced by Cambio. FIG. 20B illustrates fluorescence spectra of these fluorescent pigments. As is clear from FIG. 20A, there is no single wavelength that can concurrently induce fluorescence of all the fluorescent pigments. Therefore, a distribution of the five kinds of fluorescent pigments can be specified by the following procedure.

STEP 1: Excitation Using First Wavelength and Hyperspectral Imaging

Figure 21A:
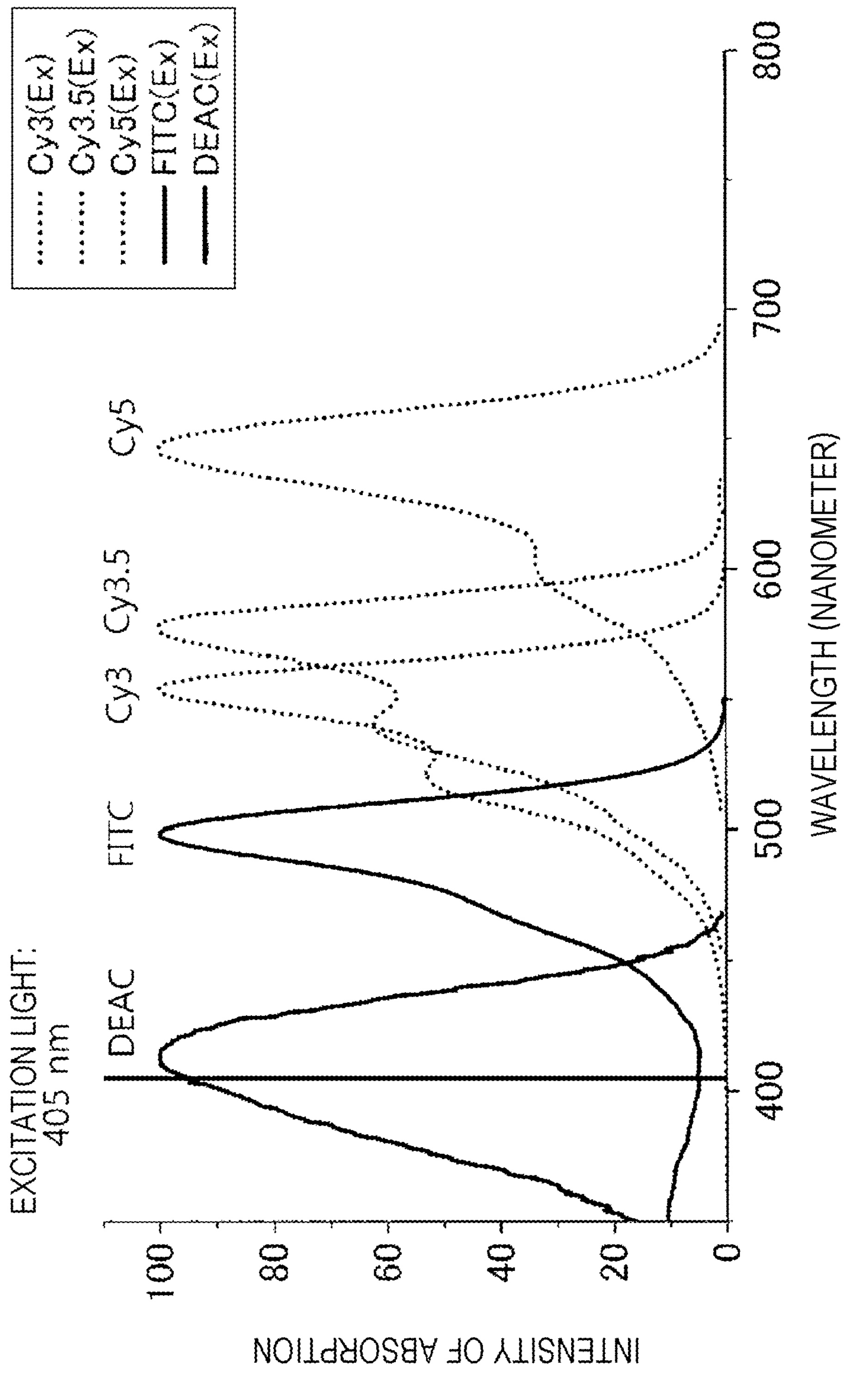
FIG. 21A illustrates a relationship between an excitation wavelength and absorption spectra of fluorescent pigments in first imaging.
Figure 21B:
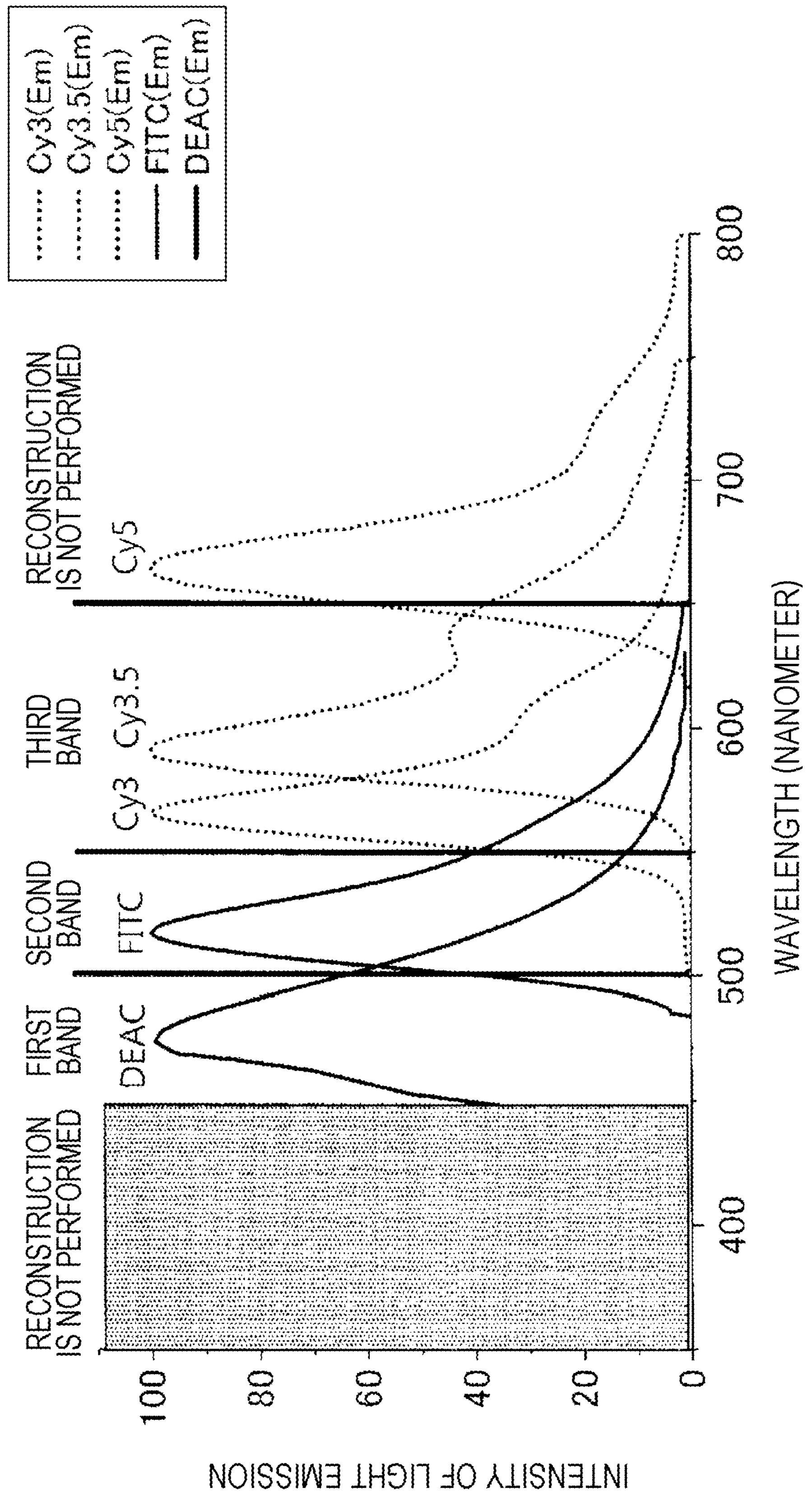
FIG. 21B illustrates an example of a relationship between fluorescence spectra and cutoff wavelength regions and reconstruction bands.

First imaging is described with reference to FIGS. 21A and 21B. FIG. 21A illustrates a relationship between an excitation wavelength and absorption spectra of the fluorescent pigments. The solid-line curves indicate absorption spectra of two kinds of pigments (DEAC and FITC) from which fluorescence is induced. The dotted-line curves indicate absorption spectra of three kinds of pigments (Cy3, Cy3.5, Cy5) from which fluorescence is not induced since sufficient absorption does not occur at the excitation wavelength. FIG. 21B illustrates an example of a relationship between the fluorescence spectra and cutoff wavelength regions and reconstruction bands.

In the present Example, the configuration of the system illustrated in FIG. 18 is used. A wavelength of the excitation light is set to 405 nanometers (nm). A cutoff wavelength of the dichroic mirror 622 and the long pass filter 624 is set to 450 nm. That is, light of wavelengths equal to or higher than 450 nm enters the detector 630. In this example, the cutoff wavelength region is a wavelength region shorter than 450 nm. The wavelength 405 nm of the excitation light is referred to as a first wavelength.

As is clear from the absorption spectra of the fluorescent pigments, fluorescence of the pigments FITC and DEAC is induced in a case where the excitation light of 405 nm is emitted. Since light of a wavelength region equal to or less than 450 nm is cut off by the dichroic minor 622 and the long pass filter 624, light of this wavelength region does not enter the detector 630. Since the absorption spectra of the fluorescent pigments Cy3, Cy3.5, and Cy5 are longer than the excitation wavelength, fluorescence is not induced from the fluorescent pigments Cy3, Cy3.5, and Cy5. Therefore, for example, there is no fluorescence at wavelengths equal to or higher than 650 nm, and a pitch-black image is output.

In view of this, it is effective to perform reconstruction, for example, while setting wavelengths 450 nm to 500 nm as a first band, setting wavelengths 500 nm to 550 nm as a second band, and setting wavelengths 550 nm to 650 nm as a third band. This makes it possible to distinguish fluorescence spectra of FITC and DEAC, which emit light on this condition, and to find a distribution of each of FITC and DEAC.

STEP 2: Excitation using Second Wavelength and Hyperspectral Imaging

Figure 22A:
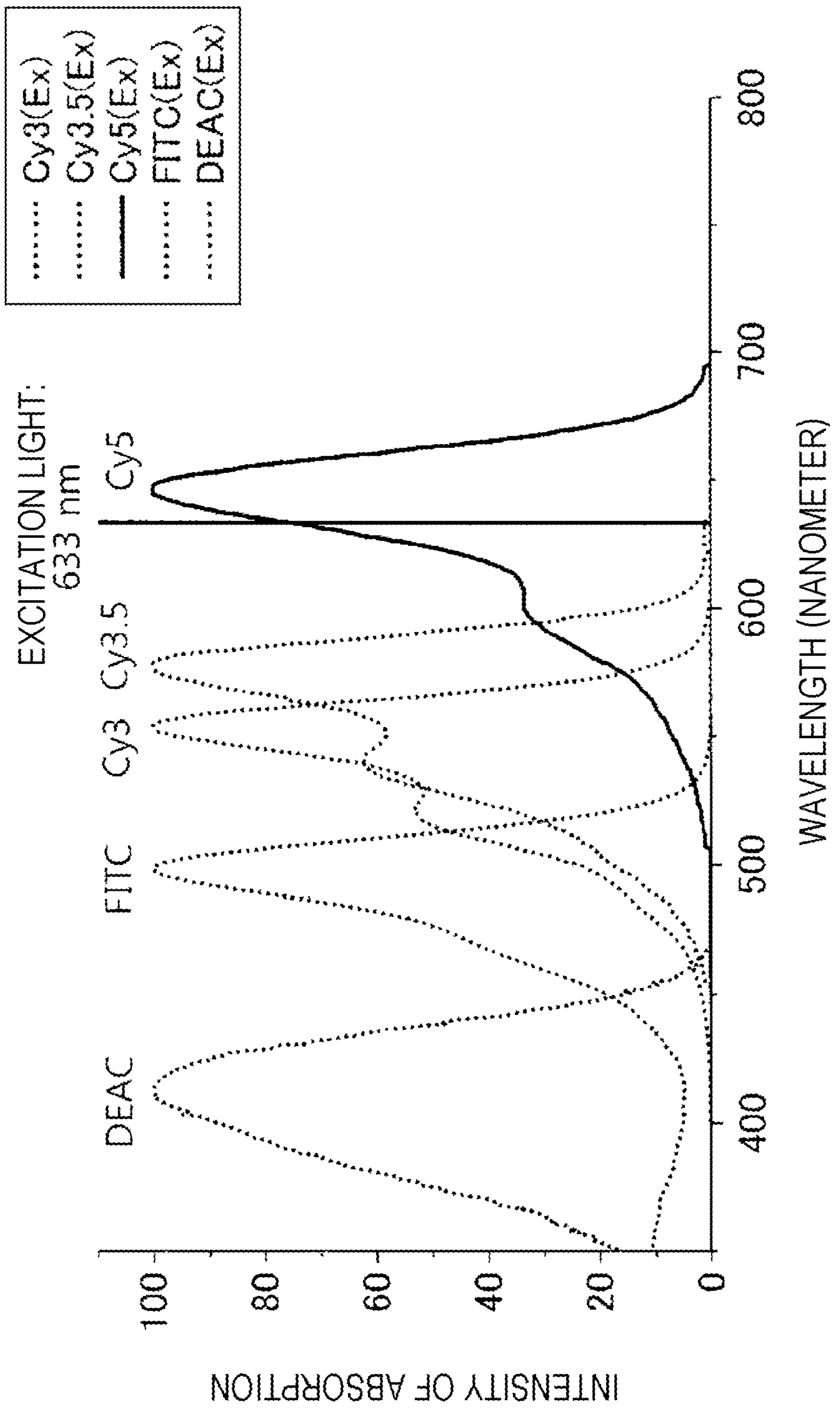
FIG. 22A illustrates a relationship between an excitation wavelength and absorption spectra of fluorescent pigments in second imaging.
Figure 22B:
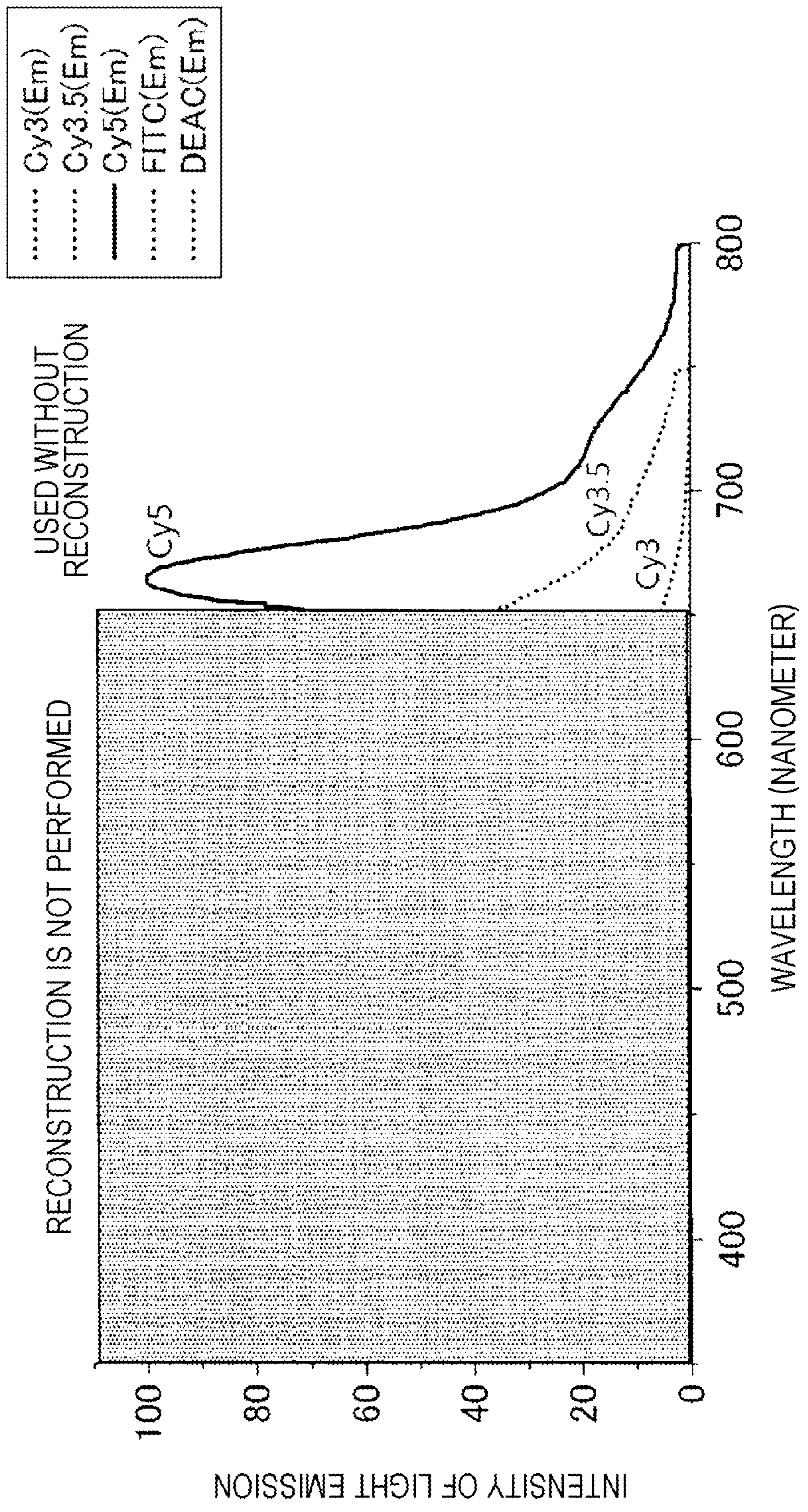
FIG. 22B illustrates an example of a relationship between fluorescence spectra and a cutoff wavelength region and a reconstruction band.

Second imaging is described with reference to FIGS. 22A and 22B. FIG. 22A illustrates a relationship between an excitation wavelength and absorption spectra of the fluorescent pigments in the second imaging. The solid-line curve indicates an absorption spectrum of the pigment (Cy5) from which fluorescence is induced. The dotted-line curves indicate absorption spectra of remaining four kinds of pigments from which fluorescence is not induced since sufficient absorption does not occur at the excitation wavelength. FIG. 22B illustrates an example of a relationship between the fluorescence spectra and a cutoff wavelength region and reconstruction bands.

In the second imaging, a wavelength of the excitation light is set to a second wavelength 633 nm, and a cutoff wavelength of the dichroic mirror 622 and the long pass filter 624 is set to 650 nm. That is, light of wavelengths equal to or higher than 650 nm enters the detector 630.

As is clear from the absorption spectra of the fluorescent pigments illustrated in FIG. 22A, fluorescence of the pigment Cy5 is efficiently induced in a case where the excitation light of 633 nm is emitted. In this case, a distribution of the pigment Cy5 can be specified from an image output from the detector 630 without performing spectral decomposition. That is, reconstruction computation processing can be omitted.

STEP 3: Excitation Using Third Wavelength and Hyperspectral Imaging

Figure 23A:
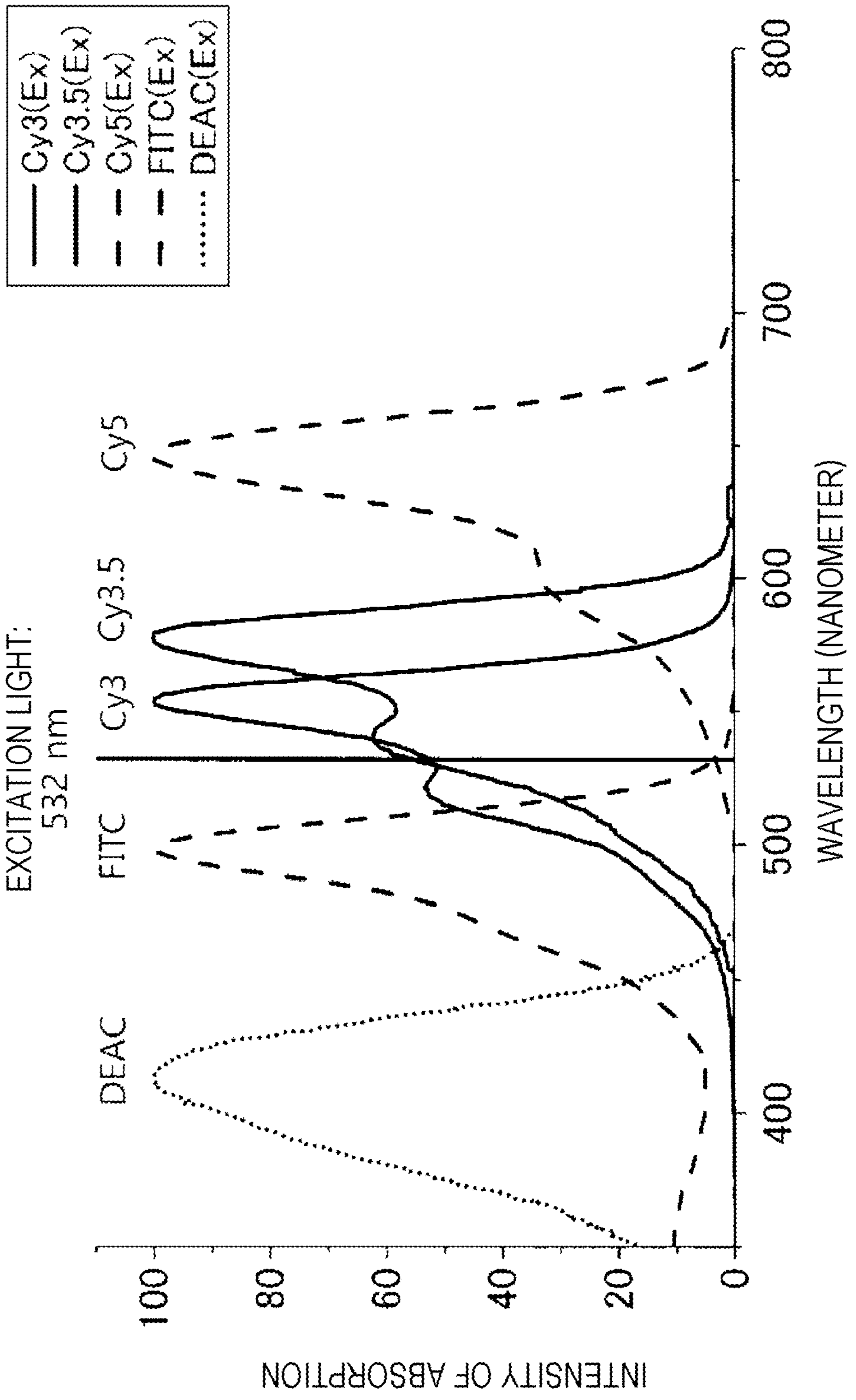
FIG. 23A illustrates a relationship between an excitation wavelength and absorption spectra of fluorescent pigments in third imaging.
Figure 23B:
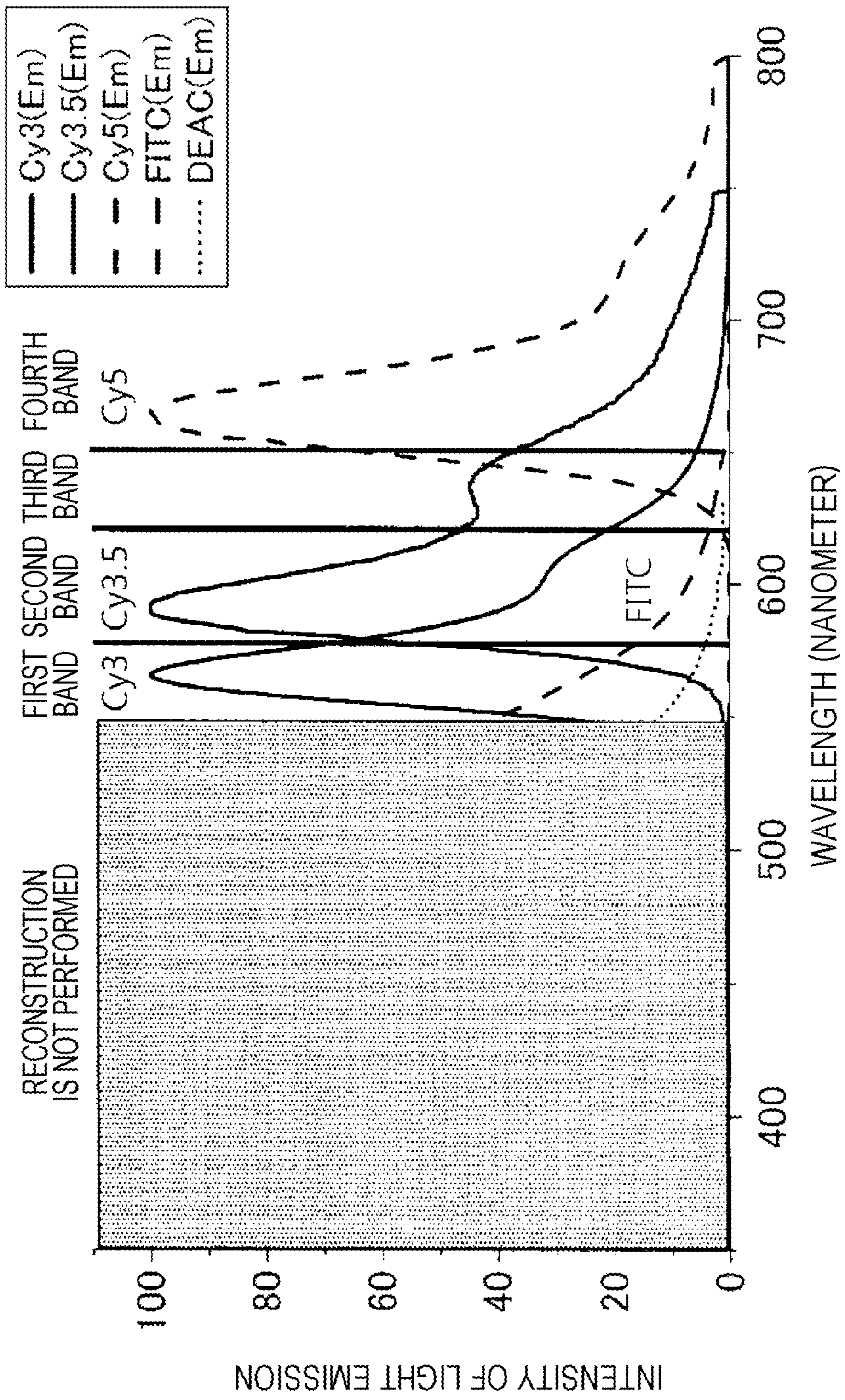
FIG. 23B illustrates an example of a relationship between fluorescence spectra and a cutoff wavelength region and reconstruction bands.

Third imaging is described with reference to FIGS. 23A and 23B. FIG. 23A illustrates a relationship between an excitation wavelength and absorption spectra of the fluorescent pigments in the third imaging. The solid-line curves indicate absorption spectra of two kinds of pigments (Cy3 and Cy3.5) from which fluorescence is induced. The broken-line and dotted-line curves indicate absorption spectra of remaining three kinds of pigments from which fluorescence is not induced since sufficient absorption does not occur at the excitation wavelength. FIG. 23B illustrates an example of a relationship between the fluorescence spectra and a cutoff wavelength region and reconstruction bands.

In the third imaging, a wavelength of the excitation light is set to a third wavelength 532 nm, and a cutoff wavelength of the dichroic mirror 622 and the long pass filter 624 is set to 550 nm. That is, light of wavelengths equal to or higher than 550 nm enters the detector 630.

As is clear from the absorption spectra of the fluorescent pigments illustrated in FIG. 23A, fluorescence of the pigments Cy3 and Cy3.5 is efficiently induced in a case where the excitation light of 532 nm is emitted. Note that the pigments FITC and Cy5 also have slight absorption, and therefore there is a possibility that these pigments also emit weak fluorescence.

In this example, the reconstruction bands are set as follows.

first band: wavelengths 550 nm to 575 nm.

This band includes fluorescence of Cy3 and Cy3.5 as main components, and there is a possibility that fluorescence of FITC is slightly included.

second band: wavelengths 575 nm to 625 nm.

This band includes fluorescence of Cy3 and Cy3.5 as main components, and there is a possibility that fluorescence of FITC is slightly included.

third band: wavelengths 625 nm to 650 nm.

This band includes fluorescence of Cy3 and Cy3.5 as main components, and there is a possibility that fluorescence of FITC and Cy5 is slightly included.

fourth band: wavelengths 650 nm to 800 nm.

This band includes fluorescence of Cy3 and Cy3.5 as main components, and there is a possibility that fluorescence of Cy5 is slightly included.

Among these components, a distribution of FITC is specified in STEP1, and a distribution of Cy5 is specified in STEP2. The fluorescence of Cy3 and Cy3.5 is included in all of the first to fourth bands. However, a fluorescence intensity ratio of these fluorescent pigments in each band is known from light emission spectra of the fluorescent pigments. Therefore, distributions of Cy3 and Cy3.5 can be found by solving a system of equations concerning an intensity or finding a pigment distribution reproducing an imaging result by simulation.

As described above, even in a case where labeling is performed by using fluorescent pigments, one or some fluorescent pigments can be caused to emit light in each measurement by restricting an excitation light spectrum. By selecting reconstruction bands in accordance with this, a distribution of each fluorescent pigment can be specified with a smaller computation amount.

Other Remarks 1

A modification of an embodiment of the present disclosure may be as follows.

A signal processing method executed by a computer, including:

performing first processing on the basis of a first instruction;

performing second processing on the basis of a second instruction; and performing third processing on the basis of a third instruction, the first processing including:

(a-1) receiving first pixel values, an image sensor outputting the first pixel values corresponding to first light from a filter array, and the first light corresponding to second light from a first subject incident on the filter array, and (a-2) generating pixel values I(11) of an image of the first subject corresponding to a first wavelength region to pixel values I(1p) of an image of the first subject corresponding to a p-th wavelength region on the basis of a first matrix and the first pixel values, the first pixel values corresponding to first pixels arranged in m rows and n columns, the first matrix being (A1A2 . . . Ap), the first matrix including first submatrices, the first submatrices being A1, A2, . . . , and Ap, the first submatrices including a q-th submatrix Aq, the first submatrices including second submatrices, the second submatrices being a r-th submatrix Ar to a (r+s)th submatrix A(r+s) where p, q, r, and s are natural numbers, q<r or (r+s)<q, 1≤q≤p, 1≤r≤p, and 1≤r+s≤p, the second processing including:

(b-1) receiving second pixel values, the image sensor outputting the second pixel values corresponding to third light from the filter array, and the third light corresponding to fourth light from a second subject incident on the filter array, and (b-2) generating pixel values I(2q) of an image of the second subject corresponding to a q-th wavelength region on the basis of the q-th submatrix Aq and the second pixel values, the second pixel values corresponding to second pixels arranged in m rows and n columns, pixel values I(2r) of an image of the second subject corresponding to an r-th wavelength region to pixel values I(2(r+s)) of an image of the second subject corresponding to an (r+s)th wavelength region being not generated on the basis of the second submatrices and the second pixel values, the third processing including:

(c-1) receiving third pixel values, the image sensor outputting the third pixel values corresponding to fifth light from the filter array, and the fifth light corresponding to sixth light from a third subject incident on the filter array, (c-2) generating pixel values I(3q) of an image of the third subject corresponding to the q-th wavelength region on the basis of the q-th submatrix Aq and the third pixel values, and (c-3) generating pixel values of an image I3c of the third subject corresponding to the r-th wavelength region to the (r+s)th wavelength region on the basis of the third pixel values and a second matrix generated on the basis of the second submatrices, the third pixel values corresponding to third pixels arranged in m rows and n columns, and pixel values I(3r) of an image of the third subject corresponding to the r-th wavelength region to pixel values I(3(r+s)) of an image of the third subject corresponding to the (r+s)th wavelength region being not generated on the basis of the second submatrices and the third pixel values.

Details of Signal Processing Method Described Above p, q, r, and s are natural numbers, and q<r or (r+s)<q, 1≤q≤p, 1≤r≤p, and 1≤r+s≤p.

Although "n×m" is used in the formulas (1) and (2), "n×m" in the formulas (1) and (2) may be rewritten as "m×n".

Each of the first instruction, the second instruction, and the third instruction may be given by a user by using the input UI 400.

The first instruction is an instruction to generate an image of the first subject corresponding to the first wavelength region to an image of the first subject corresponding to the p-th wavelength region.

The second instruction includes an instruction to generate an image of the second subject corresponding to the q-th wavelength region, and an instruction not to generate an image of the second subject corresponding to the r-th wavelength region to an instruction not to generate an image of the second subject corresponding to the (r+s)th wavelength region.

The third instruction includes an instruction to generate an image of the third subject corresponding to the q-th wavelength region, an instruction to generate images of the third subject corresponding to the r-th wavelength region to the (r+s)th wavelength region, and an instruction not to generate an image of the third subject corresponding to the r-th wavelength region to an instruction not to generate an image of the third subject corresponding to the (r+s) wavelength region.

The first processing includes the processing (a-1) and (a-2).

Processing (a-1)

The signal processing apparatus 250 receives the first pixel values from the image sensor 160. The second light from the first subject enters the filter array 110. In response to this entry, the filter array 110 outputs the first light. The image sensor 160 outputs the first pixel values corresponding to the first light from the filter array 110.

The first pixel values can be described in a matrix form of m rows and n columns as follows.

$$\begin{pmatrix} g1(1,1) & \dots & g1(1,n) \\ \vdots & \ddots & \vdots \\ g1(m,1) & \dots & g1(m,n) \end{pmatrix} \tag{10}$$

(i, j) may be considered as corresponding to a position of a pixel in an image where 1≤i≤m and 1≤j≤n.

The first pixel values can be described in a matrix form of m×n rows and 1 column as follows.

$$g1 = \begin{pmatrix} g1(1,1) \\ \vdots \\ g1(1,n) \\ \vdots \\ g1(m,1) \\ \vdots \\ g1(m,n) \end{pmatrix} \tag{11}$$

Processing (a-2)

The signal processing circuit 250 generates the pixel values I(11) of an image of the first subject corresponding to the first wavelength region to pixel values I(1p) of an image of the first subject corresponding to the p-th wavelength region on the basis of the first matrix recorded in the memory 210 and the first pixel values. This generation method has been already described by using the formulas (1) and (2).

Although "n×m" is used in the formulas (1) and (2), "n×m" in the formulas (1) and (2) is rewritten here as "m×n".

The first matrix is the matrix H of m×n rows and m×n×N columns indicated by the formula (1). Here, the matrix H is expressed as H1, and can be described as follows by using a submatrix A1 to a submatrix Ap:

$$H1=(A1\ A2\ \dots\ Ap) \tag{12}$$

Each of the submatrix A1 to the submatrix Ap may be a diagonal matrix.

$$A1 = \begin{pmatrix} h1(1,1) & \dots & 0 \\ \vdots & \ddots & \vdots \\ 0 & \dots & h1(m\times n, m\times n) \end{pmatrix} \tag{13}$$

$$\dots$$

$$Ap = \begin{pmatrix} hp(1,1) & \dots & 0 \\ \vdots & \ddots & \vdots \\ 0 & \dots & hp(m\times n, m\times n) \end{pmatrix}$$

The pixel values I(11) of the image of the first subject corresponding to the first wavelength region to the pixel values I(1p) of the image of the first subject corresponding to the p-th wavelength region can be described in a matrix form of m rows and n columns as follows.

$$I(11) = \begin{pmatrix} a11(1,1) & \dots & a11(1,n) \\ \vdots & \ddots & \vdots \\ a11(m,1) & \dots & a11(m,n) \end{pmatrix} \tag{14}$$

-continued

...

$$I(1p)=\begin{pmatrix} a1p(1,1) & \dots & a1p(1,n) \\ \vdots & \ddots & \vdots \\ a1p(m,1) & \dots & a1p(m,n) \end{pmatrix}$$

(i, j) can be considered as corresponding to a position of a pixel in an image where 1≤i≤m and 1≤j≤n.

The pixel values I(11) of the image of the first subject corresponding to the first wavelength region to the pixel values I(1p) of the image of the first subject corresponding to the p-th wavelength region can be described in a matrix form of m×n rows and 1 column as follows.

$$I(11)=\begin{pmatrix} a11(1,1) \\ \vdots \\ a11(1,n) \\ \vdots \\ a11(m,1) \\ \vdots \\ a11(m,n) \end{pmatrix} \tag{15}$$

...

$$I(1p)=\begin{pmatrix} a1p(1,1) \\ \vdots \\ a1p(1,n) \\ \vdots \\ a1p(m,1) \\ \vdots \\ a1p(m,n) \end{pmatrix}$$

This is expressed in the format of the formula (1) as follows:

$$g1=H1f1=H1\begin{pmatrix} I(11) \\ \vdots \\ I(1p) \end{pmatrix} \tag{16}$$

The first submatrices A1, A2, . . . , and Ap include the q-th submatrix Aq.

$$Aq=\begin{pmatrix} hq(1,1) & \dots & 0 \\ \vdots & \ddots & \vdots \\ 0 & \dots & hq(m\times n, m\times n) \end{pmatrix} \tag{17}$$

The first submatrices A1, A2, . . . , and Ap include the second submatrices, which are the r-th submatrix Ar to the (r+s)th submatrix A(r+s).

$$Ar=\begin{pmatrix} hr(1,1) & \dots & 0 \\ \vdots & \ddots & \vdots \\ 0 & \dots & hr(m\times n, m\times n) \end{pmatrix} \tag{18}$$

...

$$A(r+s)=\begin{pmatrix} h(r+s)(1,1) & \dots & 0 \\ \vdots & \ddots & \vdots \\ 0 & \dots & h(r+s)(m\times n, m\times n) \end{pmatrix}$$

The second processing includes the processing (b-1) and (b-2).

Processing (b-1)

The signal processing apparatus 250 receives the second pixel values from the image sensor 160. The fourth light from the second subject enters the filter array 110. In response to this entry, the filter array 110 outputs the third light. The image sensor 160 outputs the second pixel values corresponding to the third light from the filter array 110.

The second pixel values can be described in a matrix form of m rows and n columns as follows:

$$\begin{pmatrix} g2(1,1) & \dots & g2(1,n) \\ \vdots & \ddots & \vdots \\ g2(m,1) & \dots & g2(m,n) \end{pmatrix} \tag{19}$$

(i, j) can be considered as corresponding to a position of a pixel in an image where 1≤i≤m and 1≤j≤n.

The second pixel values can be described in a matrix form of m×n rows and 1 column as follows:

$$g2=\begin{pmatrix} g2(1,1) \\ \vdots \\ g2(1,n) \\ \vdots \\ g2(m,1) \\ \vdots \\ g2(m,n) \end{pmatrix} \tag{20}$$

Processing (b-2)

The signal processing circuit 250 generates the pixel values I(2q) of the image of the second subject corresponding to the q-th wavelength region on the basis of the q-th submatrix Aq recorded in the memory 210 and the second pixel values. The signal processing circuit 250 does not generate the pixel values I(2r) of the image of the second subject corresponding to the r-th wavelength region to the pixel values I(2(r+s)) of the image of the second subject corresponding to the (r+s)th wavelength region on the basis of the second submatrices and the second pixel values.

For example, the signal processing circuit 250 may perform the following processing.

The signal processing circuit 250 deletes the r-th submatrix Ar to the (r+s)th submatrix A(r+s) from the first matrix indicated by the formula (12) recorded in the memory 210 to generate a matrix H2 of n×m rows and n×m×(p−(s+1)) columns.

$$H2=(A1\ \dots\ Aq\ \dots\ A(r-1)A(r+s+1)\ \dots\ Ap) \tag{21}$$

Based on the following formula (22), in accordance with the method disclosed in the description of the formulas (1) and (2), (i) the pixel values I(21) of the image of the second subject corresponding to the first wavelength region to the pixel values I(2q) of the image of the second subject corresponding to the q-th wavelength region to the pixel values I(2(r−1)) of the image of the second subject corresponding to the (r−1)th wavelength region are generated, (ii) the pixel values I(2r) of the image of the second subject corresponding to the r-th wavelength region to the pixel values I(2(r+s)) of the image of the second subject corresponding to the (r+s)th wavelength region are not generated, and (iii) pixel values I(2(r+s+1)) of an image of the second subject corresponding to the (r+s+1)th wavelength region to the pixel values I(2p) of the image of the second subject corresponding to the p-th wavelength region are generated.

Although "n×m" is used in the formulas (1) and (2), "n×m" in the formulas (1) and (2) is rewritten here as "m×n".

$$g2 = H2f2 = H2\begin{pmatrix} I(21) \\ \vdots \\ I(2q) \\ \vdots \\ I(2(r-1)) \\ I(2(r+s+1)) \\ \vdots \\ I(2p) \end{pmatrix} \tag{22}$$

The third processing includes the processing (c-1), (c-2), and (c-3).

Processing (c-1)

The signal processing apparatus 250 receives the third pixel values from the image sensor 160. The sixth light from the third subject enters the filter array 110. In response to this entry, the filter array 110 outputs the fifth light. The image sensor 160 outputs the third pixel values corresponding to the fifth light from the filter array 110.

The third pixel values can be described in a matrix form of m rows and n columns as follows:

$$\begin{pmatrix} g3(1,1) & \dots & g3(1,n) \\ \vdots & \ddots & \vdots \\ g3(m,1) & \dots & g3(m,n) \end{pmatrix} \tag{23}$$

(i, j) can be considered as corresponding to a position of a pixel in an image where 1≤i≤m and 1≤j≤n. The third pixel values can be described in a matrix form of m×n rows and 1 column as follows:

$$g3 = \begin{pmatrix} g3(1,1) \\ \vdots \\ g3(1,n) \\ \vdots \\ g3(m,1) \\ \vdots \\ g3(m,n) \end{pmatrix} \tag{24}$$

Processing (c-2)

The signal processing circuit 250 generates the pixel values I(3q) of the image of the third subject corresponding to the q-th wavelength region on the basis of the q-th submatrix Aq recorded in the memory 210 and the third pixel values.

Processing (c-3)

The signal processing circuit 250 generates a second matrix on the basis of second submatrices recorded in the memory 210. The signal processing circuit 250 generates the pixel values I3c of the image of the third subject corresponding to the r-th wavelength region to the (r+s)th wavelength region on the basis of the generated second matrix and the third pixel values. The signal processing circuit 250 does not generate the pixel values I(3r) of the image of the third subject corresponding to the r-th wavelength region to the pixel values I(3(r+s)) of the image of the third subject corresponding to the (r+s)th wavelength region on the basis of the second submatrices and the third pixel values.

For example, the signal processing circuit 250 may perform the following processing.

The signal processing circuit 250 generates a second matrix H3 on the basis of the r-th submatrix Ar to the (r+s)th submatrix A(r+s) included in the first matrix (see the formula (12)) recorded in the memory 210.

$$H3 = \begin{pmatrix} w(1,1) & \dots & 0 \\ \vdots & \ddots & \vdots \\ 0 & \dots & w(m \times n, m \times n) \end{pmatrix} \tag{25}$$

$$Ar = \begin{pmatrix} hr(1,1) & \dots & 0 \\ \vdots & \ddots & \vdots \\ 0 & \dots & hr(m \times n, m \times n) \end{pmatrix} \tag{18}$$

...

$$A(r+s) = \begin{pmatrix} h(r+s)(1,1) & \dots & 0 \\ \vdots & \ddots & \vdots \\ 0 & \dots & h(r+s)(m \times n, m \times n) \end{pmatrix}$$

$$W(1,1)=(hr(1,1)+ \dots +h(r+s)(1,1))/(s+1), W(m\times n, m\times n)=(hr(m\times n, m\times n)+ \dots +h(r+s)(m\times n, m\times n))/(s+1).$$

The signal processing circuit 250 generates a third matrix H4 on the basis of the first matrix H1 and the second matrix H3.

$$H4=(A1 \dots Aq \dots A(r-1)H3A(r+s+1) \dots Ap) \tag{26}$$

The third matrix H4 is a matrix of n×m rows and n×m×(p−s) columns.

Based on the formula (27), in accordance with the method disclosed in the description of the formulas (1) and (2), (i) pixel values I(31) of an image of the third subject corresponding to the first wavelength region to the pixel values I(3q) of the image of the third subject corresponding to the q-th wavelength region to pixel values I(3(r−1)) of an image of the third subject corresponding to an (r−1)th wavelength region are generated, (ii) the pixel values I(3r) of the image of the third subject corresponding to the r-th wavelength region to pixel values I(3(r+s)) of an image of the third subject corresponding to an (r+s)th wavelength region are not generated, (iii) the pixel values I3c of the image of the third subject corresponding to the r-th wavelength region to the (r+s)th wavelength region are generated, and (iv) pixel values I(3(r+s+1)) of an image of the third subject corresponding to the (r+s+1)th wavelength region to pixel values I(3p) of an image of the third subject corresponding to the p-th wavelength region are generated.

Although "n×m" is used in the formulas (1) and (2), "n×m" in the formulas (1) and (2) may be rewritten as "m×n".

$$g3 = H4f3 = H4\begin{pmatrix} I(31) \\ \vdots \\ I(3q) \\ \vdots \\ I(3(r-1)) \\ I3c \\ I(3(r+s+1)) \\ \vdots \\ I(3p) \end{pmatrix} \tag{27}$$

The pixel values I3c of the image of the third subject corresponding to the r-th wavelength region to the (r+s)th wavelength region can be described in a matrix form of m rows and n columns as follows:

$$\begin{pmatrix} a3c(1,1) & \ldots & a3c(1,n) \\ \vdots & \ddots & \vdots \\ a3c(m,1) & \ldots & a3c(m,n) \end{pmatrix} \quad (28)$$

(i, j) can be considered as corresponding to a position of a pixel in an image where 1≤i≤m and 1≤j≤n.

The pixel values I3c of the image of the third subject corresponding to the r-th wavelength region to the (r+s)th wavelength region can be described in a matrix form of m×n rows and 1 column as follows:

$$I3c = \begin{pmatrix} a3c(1,1) \\ \vdots \\ a3c(1,n) \\ \vdots \\ a3c(m,1) \\ \vdots \\ a3c(m,n) \end{pmatrix} \quad (29)$$

Other Remarks 2

In the present disclosure, a compressed image may be generated by an imaging method different from imaging using a filter array including optical filters.

For example, as the configuration of the imaging device 100, the image sensor 160 may be processed so that light reception characteristics of the image sensor vary from one pixel to another, and a compressed image may be generated by imaging using the image sensor 160 thus processed. That is, a compressed image may be generated by giving a function of coding incident light to an image sensor instead of coding light incident on the image sensor by the filter array 110. In this case, mask data corresponds to the light reception characteristics of the image sensor.

It is also possible to employ a configuration in which an optical element such as a metalens is introduced as at least a part of the optical system 140 so that optical characteristics of the optical system 140 are changed in terms of space and wavelength and thus incident light is coded, and a compressed image may be generated by an imaging device including this configuration. In this case, mask data is information corresponding to optical characteristics of the optical element such as a metalens. By thus using the imaging device 100 having a configuration different from the configuration using the filter array 110, an intensity of incident light may be modulated for each wavelength, and thus a compressed image and a reconstructed image may be generated.

Other Remarks 3

The present disclosure is not limited to Embodiments 1 to 4, Example, and the modification. Various modifications of the above embodiments, Example, and modification which a person skilled in the art can think of and combinations of constituent elements in different embodiments, Example, and/or modifications may also be encompassed within the present disclosure without departing from the spirit of the present disclosure.

Note that the technique of the present disclosure is applicable not only to fluorescent observation, but also to other uses in which a spectrum of an observation target is known. For example, the technique of the present disclosure is applicable to various uses such as observation of an absorption spectrum, observation of black-body radiation (e.g., temperature estimation), and estimation of a light source (e.g., an LED, a halogen lamp).

The technique of the present disclosure is useful, for example, for a camera and a measurement device that acquires a multiple-wavelength image. The technique of the present disclosure is, for example, applicable to fluorescent observation, observation of an absorption spectrum, sensing for a biological, medical, or cosmetic purpose, a food foreign substance or residual pesticide test system, a remote sensing system, and an on-vehicle sensing system.

What is claimed is:

1. A signal processing method executed by a computer, comprising:

acquiring compressed image data including two-dimensional image information of a subject obtained by compressing hyperspectral information in a target wavelength region;

acquiring reference spectrum data including information on one or more spectra associated with the subject;

determining designated wavelength bands based on the reference spectrum data associated with the subject; and generating, from the compressed image data, pieces of two-dimensional image data corresponding to the designated wavelength bands determined based on the reference spectrum data.

2. The signal processing method according to claim 1, wherein the one or more spectra are associated with one or more kinds of substances assumed to be contained in the subject.

3. The signal processing method according to claim 1, wherein each of the designated wavelength bands includes a peak wavelength of the spectrum associated with a corresponding one of the one or more kinds of substances.

4. The signal processing method according to claim 1, wherein the reference spectrum data includes information on spectra associated with kinds of substances assumed to be contained in the subject; and the designated wavelength bands include a first designated wavelength band having no overlapping between the spectra and a second designated wavelength band having overlapping between the spectra.

5. The signal processing method according to claim 1, wherein the compressed image data is generated by using a filter array including kinds of optical filters that are different from each other in spectral transmittance and an image sensor;

the signal processing method further comprises acquiring mask data reflecting a spatial distribution of the spectral transmittance; and the pieces of two-dimensional image data are generated on a basis of the compressed image data and the mask data.

6. The signal processing method according to claim 5, wherein the mask data includes mask matrix information having elements according to a spatial distribution of transmittance of the filter array for each of unit bands included in the target wavelength region; and the signal processing method further comprises:

generating synthesized mask information by synthesizing the mask matrix information corresponding to non-designated wavelength bands different from the designated wavelength bands in the target wavelength region; and generating synthesized image data concerning the non-designated wavelength bands on a basis of the compressed image data and the synthesized mask information.

7. The signal processing method according to claim 5, wherein the generating the pieces of two-dimensional image data includes generating and outputting the pieces of two-dimensional image data corresponding to the designated wavelength bands without generating, from the compressed image data, image data corresponding to a non-designated wavelength band different from the designated wavelength bands in the target wavelength region.

8. The signal processing method according to claim 1, wherein the designated wavelength bands are determined based on an intensity of the one or more spectra indicated by the reference spectrum data or a differential value of the intensity.

9. The signal processing method according to claim 1, wherein the reference spectrum data includes information on a fluorescence spectrum of one or more substances assumed to be contained in the subject.

10. The signal processing method according to claim 1, wherein the reference spectrum data includes information on a light absorption spectrum of one or more substances assumed to be contained in the subject.

11. The signal processing method according to claim 1, further comprising displaying, on a display, a graphical user interface for allowing a user to designate the one or more spectra or one or more kinds of substances associated with the one or more spectra, wherein the reference spectrum data is acquired in accordance with the designated one or more spectra or the designated one or more kinds of substances.

12. A signal processing method executed by a computer, comprising:

acquiring compressed image data including two-dimensional image information of a subject obtained by compressing hyperspectral information in a target wavelength region;

acquiring reference spectrum data including information on one or more spectra associated with the subject;

determining designated wavelength bands based on the reference spectrum data; and displaying, on a display, both a graphical user interface for designating a reconstruction condition for generating pieces of two-dimensional image data corresponding to the designated wavelength bands from the compressed image data, and an image based on the reference spectrum data.

13. A signal processing apparatus comprising:

a processor; and a memory in which a computer program executed by the processor is stored, wherein the computer program causes the processor to:

acquire compressed image data including two-dimensional image information of a subject obtained by compressing hyperspectral information in a target wavelength region;

acquire reference spectrum data including information on one or more spectra associated with the subject;

determine designated wavelength bands based on the reference spectrum data associated with the subject; and generate, from the compressed image data, pieces of two-dimensional image data corresponding to the designated wavelength bands determined based on the reference spectrum data.

14. A signal processing apparatus comprising:

a processor; and a memory in which a computer program executed by the processor is stored, wherein the computer program causes the processor to:

acquire compressed image data including two-dimensional image information of a subject obtained by compressing hyperspectral information in a target wavelength region;

acquire reference spectrum data including information on one or more spectra associated with the subject;

determine designated wavelength bands based on the reference spectrum data; and display, on a display, both a graphical user interface for designating a reconstruction condition for generating pieces of two-dimensional image data corresponding to the designated wavelength bands from the compressed image data, and an image based on the reference spectrum data.

15. A non-transitory recording medium that is non-volatile and is a computer-readable recoding medium storing a program causing a computer to perform a process comprising:

acquiring compressed image data including two-dimensional image information of a subject obtained by compressing hyperspectral information in a target wavelength region;

acquiring reference spectrum data including information on one or more spectra associated with the subject;

determining designated wavelength bands, that are included in the target wavelength region, based on the reference spectrum data associated with the subject; and generating, from the compressed image data, pieces of two-dimensional image data corresponding to the designated wavelength bands that are included in the target wavelength region and are determined based on the reference spectrum data.

16. A non-transitory recording medium that is non-volatile and is a computer-readable recoding medium storing a program causing a computer to perform a process comprising:

acquiring compressed image data including two-dimensional image information of a subject obtained by compressing hyperspectral information in a target wavelength region;

acquiring reference spectrum data including information on one or more spectra associated with the subject;

determining designated wavelength bands based on the reference spectrum data; and displaying, on a display, both a graphical user interface for designating a reconstruction condition for generating pieces of two-dimensional image data corresponding to the designated wavelength bands from the compressed image data, and an image based on the reference spectrum data.

* * * * *